(12) United States Patent
Biedermann et al.

(10) Patent No.: US 12,436,095 B2
(45) Date of Patent: Oct. 7, 2025

(54) NANOZEOLITES AND THEIR ANALYTICAL USE AS CHEMOSENSORS IN BIORELEVANT MEDIA

(71) Applicant: Karlsruher Institut für Technologie, Eggenstein-Leopoldshafen (DE)

(72) Inventors: Frank Biedermann, Karlsruhe (DE); Laura Grimm, Rülzheim (DE); Stephan Sinn, Lörrach (DE)

(73) Assignee: Karlsruher Institut für Technologie, Eggenstein-Leopoldshafen (DE)

( * ) Notice: Subject to any disclaimer, the term of this patent is extended or adjusted under 35 U.S.C. 154(b) by 212 days.

(21) Appl. No.: 18/013,366

(22) PCT Filed: Jul. 2, 2021

(86) PCT No.: PCT/EP2021/068305
§ 371 (c)(1),
(2) Date: Dec. 28, 2022

(87) PCT Pub. No.: WO2022/003149
PCT Pub. Date: Jan. 6, 2022

(65) Prior Publication Data
US 2023/0258556 A1    Aug. 17, 2023

(30) Foreign Application Priority Data
Jul. 3, 2020 (DE) .................... 10 2020 208 359.2

(51) Int. Cl.
*G01N 21/33* (2006.01)
*C01B 39/02* (2006.01)
(Continued)

(52) U.S. Cl.
CPC .......... *G01N 21/33* (2013.01); *C01B 39/026* (2013.01); *G01N 21/6428* (2013.01); *C01P 2004/52* (2013.01); *G01N 2021/7786* (2013.01)

(58) Field of Classification Search
CPC .............. G01N 21/33; G01N 21/6428; G01N 2021/7786; G01N 21/77; C01B 39/026; C01P 2004/52; C09K 11/06
See application file for complete search history.

(56) References Cited

U.S. PATENT DOCUMENTS 6,221,677 B1 * 4/2001 Wu ................. G01N 33/54313
                                                          210/85
7,960,124 B2    6/2011 Popovic et al.
(Continued)

FOREIGN PATENT DOCUMENTS

CN    107089905 A    8/2017
EP    3225590 A1    10/2017
(Continued)

OTHER PUBLICATIONS

Espacenet Bibliographic data and English Translation for CN107089905(A), published Aug. 25, 2017, 14 pages.
(Continued)

*Primary Examiner* — Michelle M Iacoletti
*Assistant Examiner* — Maher Yazback
(74) *Attorney, Agent, or Firm* — Oliff PLC

(57) ABSTRACT

The present invention relates to the use of monodisperse nanozeolites with a specific particle size distribution in analytical determination methods, methods for the qualitative and quantitative determination of one or more neutral, zwitterionic or positively charged bioanalytes in a sample, in particular in saline media, using such nanozeolites, and new
(Continued)

chemosensors based on such nanozeolites with doping with functionalised dyes or indicators.

17 Claims, 12 Drawing Sheets

(51) Int. Cl.
*G01N 21/64* (2006.01)
*G01N 21/77* (2006.01)

(56) References Cited

U.S. PATENT DOCUMENTS

| | | | |
|---|---|---|---|
| 8,445,214 B2 | 5/2013 | Popovic et al. | |
| 2004/0026662 A1* | 2/2004 | Calzaferri | C09K 11/06 |
| | | | 252/301.16 |
| 2010/0304140 A1 | 12/2010 | Bouvier et al. | |
| 2010/0312483 A1* | 12/2010 | Peyser | G01N 33/52 |
| | | | 702/19 |
| 2016/0325271 A1 | 11/2016 | Mintova et al. | |
| 2019/0000361 A1* | 1/2019 | McShane | G01N 21/658 |
| 2019/0078131 A1* | 3/2019 | Zhu | G01N 33/5438 |
| 2020/0316605 A1* | 10/2020 | Wang | G01N 21/6428 |
| 2023/0046062 A1* | 2/2023 | Dutta | A61L 15/44 |

FOREIGN PATENT DOCUMENTS

| | | | | |
|---|---|---|---|---|
| GB | 2461686 A * | 1/2010 | | C01B 39/32 |
| KR | 102715871 B1 * | 3/2019 | | F01N 3/2066 |
| WO | 2019238805 A1 | 12/2019 | | |

OTHER PUBLICATIONS

Espacenet Bibliographic data and English Translation for WO2019238805(A1) published Dec. 19, 2019, 48 pages.

Zhu, et al., Designing hierarchical porous features of ZSM-5 zeolites via Si/Al ratio and their dynamic behavior in seawater ion complexes, Elsevier, vol. 173 (2013) pp. 78-85.

Ridder, et al., Zeolites for nitrosamine and pharmaceutical removal from demineralised and surface water. Mechanisms and efficacy, Elsevier, vol. 89 (2012) pp. 71-77.

Doussineau, et al., Two-Dye Core/Shell Zeolite Nanoparticles: A New Tool for Ratiometric pH Measurements, Advanced Functional Materials, vol. 19, (2009) pp. 117-122.

Gillies, et al., Fluorescence labelling as tool for zeolite particle tracking in nanoremediation approaches, Elsevier, vol. 550 (2016) pp. 820-826.

Kaur, et al., A polyaniline-zeolite nanocomposite material based acetylcholinesterase biosensor for the sensitive detection of acetylcholine and organophosphates, Royal Society of Chemistry, vol. 39, (2015) pp. 6899-6906.

Li, et al., Bioconjugated Fluorescent Zeolite L Nanocrystals as Labels in Protein Microarrays, vol. 22, (2011) pp. 3191-3201.

Lukarska, et al., Encapsulation of fluorescein into nanozeolites L and Y, Elsevier, vol. 260, (2018) pp. 70-75.

Sakaguchi, et al., Applications of zeolite inorganic composites in biotechnology: current state and perspectives, Springer-Verlag, vol. 67, (2005) pp. 306-311.

English Translation of Written Opinion for PCT/EP2021/068305, dated Jan. 12, 2023, 9 pages.

* cited by examiner

NANOZEOLITES AND THEIR ANALYTICAL USE AS CHEMOSENSORS IN BIORELEVANT MEDIA

CROSS-REFERENCE TO RELATED APPLICATIONS

This application claims priority to International Application No. PCT/EP2021/068305 filed 2 Jul. 2021 which claims priority to German Application DE 10 2020 208 359.29 filed 3 Jul. 2020, both of which are hereby incorporated by reference in their entireties.

INTRODUCTION

The present invention relates to the use of monodisperse nanozeolites with a specific particle size distribution in analytical determination methods, methods for the qualitative and quantitative determination of one or more neutral, zwitterionic or positively charged biogenic or bioactive molecules and active substances in a sample using such nanozeolites, and new chemosensors based on such nanozeolites doped with functionalised dyes or indicators.

BACKGROUND

The present invention deals with analytical issues and provides a new method for the determination of bio-relevant analytes (bioanalytes), such as biogenic or bioactive molecules and agents, in bio-relevant media by spectroscopic methods, based on the use of monodisperse nanozeolites with specific particle size distribution. The invention also relates to new chemosensors and their use in corresponding analytical methods, as well as to the production of the monodisperse nanozeolites and the chemosensors based thereon. In particular, the method according to the invention also allows an assay-based detection with qualitative and quantitative determination possibility of positively charged, zwitterionic and neutral biogenic or bioactive molecules and active substances in biorelevant media, such as saline or complex physiological media, by means of monodisperse nanozeolites with specific particle size distribution in spectroscopic measurement methods by means of absorbance or fluorescence.

The provision of assay-based analytical methods is of particular interest, as these offer the possibility of upscaling to high-throughput screening (HPC) and thus the rapid and mass analysis of samples (>100 000 per day).

In analytics and diagnostics, biorelevant analytes in particular have so far been detected and quantified using either complex and time-consuming coupled separation methods such as HPLC or GC-MS or protein-based assay methods. However, established assay-based methods are based on the use of sufficiently specific antigen-antibody interactions with the disadvantage of being limited to antigens as analytes, which means that numerous endogenous substances to which no immune response exists cannot be detected using such methods. Furthermore, the production of antibodies is very cost-intensive. The performance of HPLC- or GC-MS-based methods also requires special technical equipment as well as specially trained personnel to perform the tests. Home applications or rapid tests in pharmacies or doctors' practices are therefore not possible. Against this background, the use of more cost-effective materials in assay-based analyses and the provision of simplified measurement methods is reasonable and desired.

PRIOR ART

Alternative materials in assay-based analyses have already been described in some patent documents such as in EP3225590A1 and in WO2019238805A1. These describe special analytical methods using chemosensors from the group of alumino-silicate-based carrier materials in combination with dyes for the detection of (endogenous) neurotransmitters in assay format.

Specifically, EP3225590A1 describes the use of zeolite-based chemosensors for the detection of positively charged guest molecules, wherein the detection of various positively charged analytes is performed by emission spectroscopy. The measurement method is based on measuring the signal decrease of the dye conjugated to the zeolite due to interaction with the analyte in media such as water or HEPES buffer. In the procedure described therein, the dye molecules are introduced individually into the cavities of the zeolites.

WO2019238805A1 describes analytical methods based on competitive binding reactions.

The methods described in these patent documents have the disadvantage that, depending on the size of the dye molecules and on the analysis medium, the dye molecules can be washed out of the zeolite cavities.

CN107089905A discloses a triethylamine fluorescence sensor based on an L-type nanometer zeolite-rare earth beta-ketone complex hybrid material, and a manufacturing method therefor and use thereof. When triethylamine and the L-type nanometer zeolite-rare earth beta-ketone complex hybrid material react with each other, changes in the fluorescence intensity of a luminescent material can be caused and triethylamine can be distinguished and detected by exploiting the changes. The sensor has very weak sensitivity to other organic volatiles and is described for use in triethylamine gas detection.

M. Lukarska et al. *"Encapsulation of fluorescein into nanozeolites L and Y", Microporous and Mesoporous Materials* 260, 70-75, 2018 describe modified nano-zeolites (<1000 nm) with fluorescein species entrapped inside, and the study of their fluorescence intensity.

T. Doussineau et al. *Two-Dye Core/Shell Zeolite Nanoparticles: A New Tool for Ratiometric pH Measurements"; Advanced Functional Materials* 19, 117-122, 2009 describes the preparation of core/shell nanosensors consisting of a zeolite core (polymorphic zeolite beta) containing the reference dye 3-hydroxyflavone and an amorphous silica shell with pH-sensitive fluorescein embedded in it, and the study of their pH sensitivity by steady-state fluorescence spectroscopy in samples consisting of suspensions in buffered aqueous solutions.

Furthermore, the chemosensors used so far in the known analytical methods are limited to emission (fluorescence) as a signal, which does not allow the differentiation of structurally similar but functionally different analytes, such as the neurotransmitters dopamine and serotonin, due to the non-specific fluorescence spectrum characteristics. In terms of absorbance, only the measurement of solid-state UV-Vis is possible. The detection of neutral molecules is not possible with the known methods and the chemosensors used in them.

In addition, these known methods are limited to low-saline detection media, i.e. "minimal buffers", and are not stable enough for application in saline, biorelevant media such as physiological media or directly in endogenous fluids such as blood, human urine etc. Sedimentation and instability of the chemosensors in biorelevant media (saline or complex media such as blood or human urine) clearly limits their applicability. The previous alumino-silicate-based chemosensors with a polydisperse particle distribution in the micrometre range are disadvantageous because they show significant sedimentation. This leads to baseline problems due to negative drift (caused by sedimentation) and creates batch-to-batch differences with reduced reproducibility when used in prototype assays. Particle size dependent properties such as response time are also adversely affected by polydisperse chemosensor particles. In order to minimise ageing effects due to sedimentation, dispersions of such polydisperse alumino-silicate-based chemosensor particles have to be prepared "fresh" on a regular basis, which is disadvantageous from the point of view of process economy and efficiency.

The publication by Li et al. "*Bioconjugated Fluorescent Zeolite L Nanocrystals as Labels in Protein Microarrays*"; *small*, 7, No. 22, 3193-3201, 2011 describes the use of zeolites in fluorescence-based analytical methods, wherein a fluorescent dye is loaded into the zeolite L-cavities and subsequently the silanol groups on the outside of the dye-loaded zeolite particles are functionalised in several steps to immobilise selected antibodies on them. The method described therein is thus limited to protein microassays with antigen-antibody interaction, whereas small neurotransmitters to which no direct bioresponse exists cannot be detected.

The publication by Balwinder Kaur and Rajendra Srivastava "*A polyaniline-zeolite nanocomposite material based acetylcholinesterase biosensor for the sensitive detection of acetylcholine and organophosphates*"; *New J. Chem.*, 39, 6899-6906, 2015 describes a composite of a polyaniline film with zeolites in the form of a conductive polymer film surface-coated zeolite, wherein the porous zeolites provide enhanced diffusion of analytes into the electrode material of the polymer film. The measuring principle is based on the sensitive electrochemical detection of acetylcholine on the polyaniline film. Other neurotransmitters are not detected, but the detection of dopamine and epinephrine is mentioned in previous publications by the authors, which are also based on electrochemical measurements and not on spectroscopic methods and the interaction of molecules within the zeolite cavities.

EP2089320B1 describes a method in which zeolite L is loaded with spectroscopically active molecules, which are trapped in the zeolite cavities using stoppers. Subsequently, biological detection units are covalently attached to the zeolites. In this method, too, the detection of the analytes is based exclusively on antigen-antibody interactions due to the use of biological recognition units.

A special group of zeolites, Faujasite zeolites, with specific Si/Al ratios and special particle size distributions is described in EP3089942B1 and in US2010/304140 cited therein. However, none of these documents discloses a use of such Faujasite zeolites in analytical determination methods, but at most as catalysts or adsorbents in gas-solid and liquid-solid reactions.

Object to be Solved

The object of the present invention was to provide a new method for the determination of biorelevant analytes which does not have the disadvantages of the methods described. In particular, the object of the present invention was to provide a new method for the qualitative and/or quantitative determination of positively charged, zwitterionic and/or neutral biorelevant analytes, i.e. analytes from the group of so-called bioanalytes. A further object of the present invention was to provide a new method for the determination of such biorelevant analytes in assay-based determination methods. Another object of the present invention was to provide a new method for the determination of such biorelevant analytes in saline or complex physiological reaction media. A further object of the present invention was to provide a new method for the determination of such biorelevant analytes by spectroscopic absorbance and/or fluorescence-based methods, in particular for UV-Vis-based methods. A further object of the invention was to develop suitable chemosensors which are improved with respect to their suitability for the determination of such biorelevant analytes under the said determination conditions.

These objects have been solved by the embodiments and aspects of the invention described in the claims and in detail below.

DESCRIPTION OF THE INVENTION

The present invention is described in more detail below and, in particular, includes the following aspects:

[1] Use of monodisperse nanozeolites with a particle size distribution in the range of 5 to 400 nm for the determination of neutral, zwitterionic and/or positively charged bioanalytes by UV-Vis or fluorescence spectroscopy.

[2] The use according to [1], wherein the monodisperse nanozeolites have a particle size distribution in the range of 5 to 200 nm.

[3] The use according to [1] or [2], wherein the monodisperse nanozeolites have an Si/Al ratio of from 0.5 to 50, preferably from 1 to 50.

[4] The use according to [1] to [3], wherein the determination of the bioanalytes is carried out from a liquid phase.

[5] The use according to [1] to [4], wherein the monodisperse nanozeolites are in the form of a colloidal dispersion of monodisperse nanozeolite particles in an aqueous medium.

[6] The use according to [1] to [5], wherein the monodisperse nanozeolites are in the form of a colloidal dispersion of monodisperse nanozeolite particles in water or a saline medium.

[7] The use according to [1] to [6], wherein the monodisperse nanozeolites are present in the form of a layer, film or coating of the colloidal dispersion of monodisperse nanozeolite particles in aqueous medium, preferably water or saline medium, obtainable by means of spraying process or aerosol printing on a carrier.

[8] The use according to [1] to [7], wherein the bioanalytes to be determined are biogenic and bioactive molecules selected from the groups of hormones, lipids, metabolites, neurotransmitters and bioactive agents.

[9] The use according to [1] to [8], wherein the bioanalytes to be determined are selected from the group consisting of serotonin, dopamine, tryptamine, tyramine, epinephrine, norepinephrine, phenylephrine, octopamine, phenethylamine, histamine, nicotine, propanolol, L-DOPA, phenylalanine, tyrosine, histidine, tryptophan (Trp), TrpNH$_2$, 5-HTP, TrpGly, indole, indole-3-acetic acid, melatonin, adenosine, estradiol, propanil, catechol, paracetamol, acetylcholine, glycine (Gly), D-serine, aspartate, glutamate, GABA, cadaverine, ethanolamine and glucose.

[10] The use according to [1] to [9] for the determination of neutral, zwitterionic and/or positively charged bioanalytes in physiological media or endogenous fluids, in particular in PBS, urine, saliva, blood, lymph fluid, cerebrospinal fluid, sperm, amniotic fluid, tear fluid or sweat.

[11] The use according to [1] to [10], wherein the bioanalytes to be determined are selected from the group of positively charged biogenic and bioactive molecules and active substances and the monodisperse nanozeolites have an Si/Al ratio of 0.5 to 50, preferably of 1 to 50.

[12] The use according to [1] to [10], wherein the bioanalytes to be determined are selected from the group of neutral and/or zwitterionic analytes and the monodisperse nanozeolites have an Si/Al ratio of 10 to 20.

[13] The use according to [1] to [12], wherein the monodisperse nanozeolites are selected from the group of Faujasite nanozeolites or from the group of LTL (Linde type L) nanozeolites.

[14] The use according to [1] to [13] for assay-based determination of the bioanalytes.

[15] The use according to [1] to [14], wherein the monodisperse nanozeolites are present doped with one or more functionalised dye molecules.

[16] The use according to [15], characterised in that the functionalised dye or indicator molecules are sterically anchored in the cavities of the monodisperse nanozeolites.

[17] A method for the determination of neutral, zwitterionic and/or positively charged bioanalytes by UV-Vis or fluorescence spectroscopy using monodisperse nanozeolites having a particle size distribution in the range of 5 to 400 nm, as defined in any one of [1] to [16].

[18] The method according to [17], comprising the steps
  i) providing or preparing a dispersion of the monodisperse nanozeolites having a particle size distribution in the range of 5 to 400 nm in an aqueous medium which may already contain the bioanalytes to be determined;
  ii) optionally, adding the dispersion according to i) to the medium containing the bioanalytes to be determined or to the endogenous fluids to be analysed, such as urine, saliva, blood or cerebrospinal fluid;
  iii) optionally, producing a layer, film or coating of the dispersion according to i) or ii) on a carrier by means of spraying or aerosol printing;
  iv) Determination of the bioanalytes in the dispersion according to i) or ii) or in the layer, film or coating according to iii) by UV-Vis or fluorescence spectroscopy;
  wherein the method may be further specified by the features according to any one of [1] to [17].

[19] The method according to [18], wherein prior to step i) the monodisperse nanozeolites are prepared by particulating a zeolite material to a monodisperse particle size distribution in the range of 5 to 400 nm by means of sonication with high acoustic intensity (operating frequency ≥30 kHz, energy density ≥300 W cm$^2$).

[20] The method according to [19], wherein the dispersion of the particulated zeolite materials is additionally subjected to sterile high-pressure filtration.

[21] The method according to any one of [18] to [20], comprising the additional step of doping the nanozeolites with one or more functionalised dyes or indicators, wherein in the case of high acoustic intensity sonication according to [19] or [20], the dye doping may take place before or after the high acoustic intensity sonication.

[22] Process for the preparation of monodisperse nanozeolites having a particle size distribution in the range of 5 to 400 nm by particulating a zeolite material to a monodisperse particle size distribution in the range of 5 to 400 nm by means of sonication with high acoustic intensity (operating frequency ≥30 kHz, energy density ≥300 W cm$^2$).

[23] The process according to [22], wherein the zeolite material particulated by sonication with high acoustic intensity is converted into a colloidal dispersion in an aqueous medium.

[24] The process according to [23], wherein the dispersion of the particulated zeolite material is subjected to sterile high-pressure filtration.

[25] The method according to any one of [22] to [24], wherein the nanozeolites are doped with one or more functionalised dyes or indicators before or after particulation by sonication with high acoustic intensity.

[26] The process according to any one of [22] to [25], wherein the obtained monodisperse nanozeolites having a particle size distribution in the range of 5 to 400 nm are converted into a layer or film or coating on a support by means of spraying or aerosol printing.

[27] Monodisperse nanozeolites, colloidal dispersion of monodisperse nanozeolites or layer, film or coating of monodisperse nanozeolites of a colloidal dispersion in aqueous medium on a support having a particle size distribution in the range of 5 to 400 nm, obtainable by a process as defined in any one of [18] to [27].

[28] Monodisperse nanozeolites having a particle size distribution in the range of 5 to 400 nm and doped with one or more functionalised dyes or indicators, wherein the monodisperse nanozeolites may be further specified by the features according to one or more of the preceding embodiments.

[29] Monodisperse nanozeolites according to [28], wherein the functionalised dye or indicator molecules are sterically anchored in the cavities of the monodisperse nanozeolites.

The zeolites according to the invention are insoluble in water-based media and can only be introduced into liquid media by dispersion for a limited period of time. For this reason, previously known polydisperse alumino-silicate-based chemosensors are not stable over a longer period of time in a dispersion solution such as an aqueous reaction medium (FIG. 1a). Long-term measurements, such as the tracking of slow enzyme kinetics, cannot be accurately displayed because sedimentation of the zeolite chemosensor used distorts the readout signal (FIG. 1b). In addition, already prepared zeolite-water mixtures must be redispersed before each use and, in order to achieve reproducible results, these dispersions must be used within a few minutes.

It was surprisingly found that the use of monodisperse nanozeolites with a specific particle size distribution in the range of 5 to 400 nm makes it possible to stably store a zeolite dispersion prepared from it for several months. Chemosensors based on this zeolite can also be stored in solution for the same period of time. In a preferred aspect of the invention, the particle size distribution of the monodisperse nanozeolites is in the range of 5 to 400 nm, more preferably in the range of 10 to 300 nm, even more preferably in the range of 20 to 200 nm, most preferably in the range of 40 to 160 nm.

The numerical ranges given here are subject to certain ranges of variation, which may deviate upwards and downwards within a range of ±35%.

The particle size distribution is determined by means of dynamic light scattering (DLS), as described in detail in the example section.

The almost monodisperse distribution and the small particle size compared to other zeolites reduces the sedimentation tendency or velocity of the nanozeolite particles, so that the stability of the dispersions is increased, the shelf life is prolonged and the scatter in the analytical procedure is reduced (FIG. 2a). This effect can be increased by reducing the particle size distribution and setting a narrower particle size distribution range. The dispersion procedures required when using the previously known zeolites, such as mixing by shaking or sonicating, are no longer necessary. This facilitates handling enormously, enables upscaling processes and the long-term application of zeolite-based chemosensors. Like the nanozeolites, these are stable in solution for months. Furthermore, the signal-to-noise ratio is significantly improved by the higher homogeneity of the dispersions and the detection lower limit is thus extended (FIG. 2b).

The nanozeolites according to the invention have an Si/Al ratio in the range of 0.5 to 50, preferably in the range of 1 to 50, more preferably in the range of 1 to 30, even more preferably in the range of 1.5 to 20. An Si/Al ratio of 1.5 has been found to be particularly advantageous.

For embodiments according to the invention, wherein the bioanalytes to be determined are selected from the group of positively charged bioanalytes, monodisperse nanozeolites with an Si/Al ratio of ≥1.5, more preferably of ≥3, have been shown to be particularly advantageous. For the determination of positively charged bioanalytes, an Si/Al ratio of 0.5 to 50, preferably of 1 to 50, or an Si/Al ratio of 1.5 to 50, or an Si/Al ratio of 3 to 50 is preferred. More preferred is an Si/Al ratio of 1.76 to 10, even more preferred of 3 to 10. The most suitable Si/Al ratio is selected in relation to the specific conditions of the respective analytical procedure.

For embodiments according to the invention, wherein the bioanalytes to be determined are selected from the group of neutral or zwitterionic bioanalytes, monodisperse nanozeolites with an Si/Al ratio of 10, more preferably of 15, have proven to be particularly advantageous. An Si/Al ratio of 10 to 20 is preferred, more preferably of 15 to 20. The most suitable Si/Al ratio is selected in relation to the specific conditions of the respective analytical procedure.

Zeolites have in common a system of open channels in the aluminosilicate framework through which guest molecules can be taken up into the structure and released again. According to the interconnection of these channels, the zeolites are divided into different groups, those with a one-dimensional system of channels (the channels are not interconnected), those with a two-dimensional system of channels (the channels are interconnected to form a layered system) and those with a three-dimensional system of channels. In principle, the nanozeolites according to the invention can be selected from all of these three groups, provided that they are suitable for use according to the invention.

In a preferred embodiment, the zeolites according to the invention are selected from the group of Faujasites, such as those described in EP3089942, or from the group of LTL zeolites (LTL =Linde type L). Faujasites belong to the group of zeolites with a three-dimensional system of channels and crystallise cubically with basic elements of the Faujasite framework in the form of sodalite cages connected by hexagonal prisms. Within the group of Faujasite zeolites, a distinction is made between so-called X-Faujasites, Y-Faujasites and mixtures of X- and Y-Faujasites, depending on the respective Si/Al ratio. EP3089942 defines a Si/Al ratio of 1 to 1.5 for X-Faujasites and a Si/Al ratio of >1.5 for Y-Faujasites. Wikipedia.org, on the other hand, defines a Si/Al ratio of 2 to 3 for X-Faujasites and 3 for Y-Faujasites.

In a further preferred embodiment, the zeolites according to the invention are selected from the group of LTL zeolites, which belong to the group of zeolites with a one-dimensional system of channels and crystallise hexagonally.

For certain embodiments according to the invention described herein, the Si/Al ratio is decisive and thus, for such preferred embodiments, those Faujasites or LTL zeolites are preferably selected which have a Si/Al ratio in the ranges defined herein. One possible embodiment comprises monodisperse nanozeolites from the group of Faujasites or LTL zeolites with a particle size of about 50 nm and a Si/Al ratio of 1.76.

The nanozeolites according to the invention and new chemosensors based thereon, as described in more detail below, can be produced from already known zeolites by a new process according to the invention in order to provide monodisperse nanozeolites and chemosensors with the improved dispersion properties and increased stability. By using ultrasound in ultrasonic baths, the mixing and dissolving of substances is realised in chemical laboratory work. In this process, the low-frequency sound impinges indirectly on the sample to be treated (mixture of substances, sample in solution or dispersion) via the outer walls of a sample vessel. However, the application of ultrasound to zeolite materials to achieve a finer distribution is only marginal in its effect and does not lead to a reduction in the size of the zeolite particles. Surprisingly, it was found that the use of a rod sonicator with very high sound intensity (operating frequency 30±1 kHz, energy density ≥300 W cm$^2$), which is in direct contact with the zeolite material to be treated, leads to the particulation and subsequent fine distribution of the resulting zeolite particles (nanoparticles) when exposed for a sufficiently long time. This process can thus be used to produce the nanozeolites of the invention with the particle size distribution according to the invention.

Sonication can be carried out either directly in the biological (physiological) medium to be analysed, such as directly in the urine to be examined, or in a suitable aqueous medium. In this way, colloidal dispersions of the nanozeolites according to the invention are obtained. The zeolite material particulated by means of sonication with high acoustic intensity is preferably prepared in the form of a colloidal dispersion in an aqueous medium, preferably in water or a saline medium, which is then added for analysis to the analysis medium to be examined (e.g. urine, blood, etc., as defined in more detail below).

In order to obtain an even narrower particle size distribution, which has an advantageous effect on the reproducibility of the analyses, the dispersions of nanozeolite particles obtained can additionally be pressed through special sterile filters at high pressure (FIG. 3 illustrates the effects of the steps used). As mentioned above, the particulation of the particles and the narrower particle size distribution has an advantageous effect on the (temporal) stability, storability and dispersion properties of dispersions prepared from them.

So far, the use of alumino-silicate-based chemosensors in analytical procedures using UV-Vis spectra has only been described with dried material in the solid phase, which does not allow a practicable application as a chemosensor in assay-based analytical procedures and for the analysis of endogenous media. Analyses of urine, for example, would require drying of the medium with the analytes dissolved in it, which is time-consuming. Solid-phase absorption spectra also show strong, undesirable scattering effects that affect the baseline. Measurements of UV-Vis absorption spectra in solutions or dispersions of the zeolites or chemosensors previously described for such purposes in water or aqueous media are not possible because scattering effects mask the entire spectrum. The method according to the invention with the use of the nanozeolites according to the invention thus has the further advantage that instrumentally very simple absorption measurements are possible, since it is now possible to work with dispersion for the first time. The resulting spectra provide much more information than corresponding emission spectra. With the colloidal dispersions according to the invention, scattering-effect-free (resolved) UV-Vis absorption spectra can be obtained (FIGS. 4a and b) and, due to the availability of resolved absorption spectra and the analyte-specific characteristics visible in them, analyte mixtures, such as of dopamine and serotonin, can now also be detected and distinguished (FIG. 4c). This was previously not possible in the solid phase.

The invention thus also relates to novel methods for the determination of neutral, zwitterionic and/or positively charged bioanalytes, as described below, by UV-Vis or fluorescence spectroscopy, using the monodisperse nanozeolites of the invention having a particle size distribution in the range of 5 to 400 nm, as described in detail herein. The determination methods according to the invention are preferably applicable for assay-based determinations of bioanalytes. The determination of the bioanalytes is carried out by means of UV-Vis or fluorescence spectroscopy, with a preferred focus on UV-Vis spectroscopy, which is now accessible for the first time.

In the analytical methods according to the invention, wherein the nanozeolites with specific particle size distribution described herein are used, the nanozeolites are preferably present in the form of a dispersion in an aqueous medium. It is essential that the nanozeolites are present in a monodisperse distribution, whereby the term "monodisperse" in the sense of the invention means that the nanozeolites according to the invention are present essentially in the form of nanoparticles ("nanozeolite particles"), i.e. individualised, single nanocrystals, with approximately the same size and shape. In this context, the terms "nanoparticles" or "nanocrystals" as used in the invention are understood to mean the presence of particles of individual nanocrystals or non-agglomerated nanocrystals.

In the dispersions according to the invention, the nanozeolite particles are thus present in aqueous media in a preferred and essentially non-agglomerated state. However, this does not exclude that a certain proportion of the nanozeolite particles also agglomerates, whereby the proportion of agglomerated nanozeolite particles should preferably be kept low in order to avoid undesired scattering effects.

If too large particles or agglomerates are present in such a dispersion, the scattering increases and the detection of the analytes is impaired, which is why low polydispersity and low agglomeration in the dispersion are important.

The dispersions described herein are colloidal dispersions of the monodisperse nanozeolite particles of the invention with the specific particle size distribution in an aqueous medium. The dispersion medium is preferably water or an aqueous solution. Saline or physiological media are preferred. The term "saline media" as used in the present invention refers to aqueous media with a high salt concentration, such as those prevalent in endogenous fluids or secretions. The term "endogenous fluids" or "endogenous secretions" includes both those of humans and animals, although human endogenous fluids or secretions are preferred. Saline media or media with a high salt concentration in the sense of the present invention preferably refers to media having a concentration of sodium ions ([Na+]) in the range of 20 to 500 mM, preferably in the range of 40 to 300 mM, particularly in the range of 50 to 200 mM.

Saline or physiological media include, for example, buffers such as PBS, or physiological saline, but also biological media such as artificial CSF or endogenous fluids and secretions such as urine, digestive secretions such as saliva, gastric juice, pancreatic secretions, or bile, blood, lymphatic fluid, CSF, semen, amniotic fluid, lacrimal fluid or sweat. Preferably, the aqueous medium is selected from the group comprising water, physiological saline, PBS, artificial CSF, urine, saliva, blood (comprising blood serum/human serum (HS) and human serum albumin/human serum albumin (HSA)), CSF, amniotic fluid, semen and sweat. Preferably, the aqueous medium is selected from the group comprising water, PBS, urine, saliva, blood and CSF. Most preferably, the aqueous medium is selected from the group comprising water, PBS, urine and blood.

The [Na+]-concentration of such media are in the range defined above, e.g. in the artificial CSF used here with 78 mM, in blood between 135 and 145 mM, and in urine between 50 and 200 mM. In such physiological or endogenous media, other ions or salts are of course present, but the [Na+] concentration is decisive for classification as a "saline medium".

In another aspect of the invention, it is also possible to convert the dispersion of the monodisperse nanozeolite particles into a layer, in the sense of a film or coating, by means of a spray process or aerosol printing process. By producing a so-called "ink", the colloidal dispersions can be applied in several ultra-thin layers to various surfaces of a carrier, e.g. of glass, paper or plastic, such as glass slides, quartz or PS surfaces, by means of spray printing processes and anchored to the surface of the carrier by the evaporation of the liquid components of the aerosol. Also for this aspect of the invention, the particle size distribution according to the invention is crucial, e.g. to prevent clogging of the nozzle with the nanozeolite particles and to form good aerosols. Such layers, films or coatings of the colloidal dispersions are also suitable for determination methods using both fluorescence and UV-Vis spectroscopy.

The methods according to the invention using the nanozeolites described herein are particularly suitable for the detection and qualitative and quantitative determination of neutral, zwitterionic and positively charged analytes selected from the group of bioanalytes, i.e. in particular biogenic and bioactive molecules.

The term "bioanalytes" refers to analytes or substances to be analysed that are biologically or physiologically relevant (biorelevant analytes) and occur, for example, in the human or animal body and are physiologically active there, such as messenger substances (neurotransmitters), metabolites, hormones, etc. The bioanalytes to be determined are biogenic and bioactive molecules and preferably selected from the groups of hormones, lipids, metabolites, neurotransmitters and bioactive agents. For example, the group of bioanalytes includes the following substances: Serotonin, Dopamine, Tryptamine, Tyramine, Epinephrine, Norepinephrine, Phenylephrine, Octopamine, Phenethylamine, Histamine, Nicotine, Propanolol, L-DOPA, Phenylalanine, Tyrosine, Histidine, Tryptophan (Trp), Tryptophanamides, 5-HTP, TrpGly, indole, indole-3-acetic acid, melatonin, ascorbic acid, adenosine, estradiol, propanil, catechol, acetylcholine, glycine (Gly), D-serine, aspartate, glutamate, GABA, cadaverine, ethanolamine and glucose. Preferred bioanalytes are selected from the group comprising serotonin and dopamine.

However, the invention is not limited to such bioanalytes, but is also applicable to other neutral, zwitterionic or positively charged analytes, such as paracetamol.

From the group of the aforementioned bioanalytes, the following substances belong to the group designated as "positively charged analytes" according to the invention: serotonin, dopamine, tryptamine, tyramine, epinephrine, norepinephrine, phenylephrine, octopamine, phenethylamine, histamine, nicotine, propanolol, histidine, tryptophanamides, acetylcholine, cadaverine, ethanolamine.

From the group of bioanalytes mentioned above, the following substances belong to the group designated as "neutral analytes" according to the invention: Indole, Glucose, Catechol, Ascorbic acid, Propanil, Estradiol, Melatonin, Indole-3-acetic acid, TrpGly, Tryptophan (Trp), 5-HTP, L-DOPA, Paracetamol, Phenylalanine, D-serine, Aspartate, Glutamate, GABA, Glycine (Gly), Tyrosine, Adenosine. The method of the present invention can also be used, for example, to detect tryptophan, which is neutral on the outside but has a charge within the molecule and can thus also be described as zwitterionic.

Another aspect of the invention relates to new chemosensors based on the monodisperse nanozeolites according to the invention. Herein, the term "chemosensor(s)" in the sense of the invention refers to the zeolites according to the invention which are present in combination with one or more dyes or indicators. Chemosensors in the sense of such zeolite-dye/indicator combinations are known, for example, from the above-mentioned patent specifications EP3225590A1 and WO2019238805A1. For the production of the chemosensors described therein, the dye or indicator molecules are introduced individually into the cavity of the zeolites and deposited therein or are present conjugated with them.

However, this can lead to the undesired effect that the dye or indicator is forced out of the zeolite by high salt concentrations of the analysis medium in the course of a cation exchange reaction and the signal-generating binding pockets are then no longer available for the detection of relevant analytes. The higher the salt concentration, the stronger the cation exchange reaction takes place, in favour of the dissolved metal cations and to the disadvantage of the embedded or conjugated dyes or indicators. The balance of the chemosensor shifts to the side of dissociation and the dye binding pockets (cavities), which can give an analytical signal, are lost (FIG. 5).

When using such known chemosensors, the applicability in saline media with high salt concentration is thus limited. Buffers containing sodium, for example those with sodium salts such as sodium phosphate or sodium chloride, lead to cation exchange reactions and a decomposition of the known alumino-silicate-based chemosensors, making them dysfunctional. When using known chemosensors, HEPES buffers are therefore used instead. Since physiological or biological media and most endogenous fluids, such as PBS, urine, saliva, sweat or blood, etc., also contain sodium salts, the use of HEPES buffers is not recommended. also contain sodium salts in high concentrations, the known alumino-silicate-based chemosensors are equally limited for analytical determinations in such media.

A further aspect of the invention thus relates to suitable modifications of the nanozeolites used according to the invention in order to improve their stability and thus their broad applicability in analytical determination methods with saline media or dispersions with a high salt concentration. It has been surprisingly shown that the nanozeolites according to the invention can be stabilised against cation exchange reactions and decomposition in saline media by doping them with functionalised dye or indicator molecules. In this case, the dye molecules are localised within the cavities. By using functionalised dye or indicator molecules, the dyes or indicators are not merely incorporated into the zeolite channels or conjugated with them, e.g. by covalent or ionic bonds, but are quasi mechanically or sterically anchored therein. The anchoring of the dye or indicator molecules is achieved by covalent or chemical bonding or polymerisation of the dye/indicator monomers among each other within the zeolite cavities by means of ship-in-the-bottle approaches, which leads to salt-stable chemosensors (FIG. 6). The resulting enlargement of the intercalated dye/indicator molecules (e.g. formed polymers) results in a mechanical or steric anchoring of the dye/indicator molecules with the nanozeolite by which they can no longer be washed out of the cavity for steric reasons or with greater difficulty in the cation exchange reaction. This results in a persistence of the signal-giving cavities even under the influence of high salt concentrations and thus enables an extended and stable applicability in biological media and directly in the body's own fluids or secretions, such as urine, saliva, sweat, sperm, blood etc.

Such modified novel chemosensors can be obtained by adding the dye/indicator molecules (single molecules/monomers) to the nanozeolite particles of the invention. This can be done in the case of preparation of the nanozeolite particles by sonication with high acoustic intensity (operating frequency ≥30 kHz, energy density ≥300 W $cm^2$), as described above, both before and after sonication with high acoustic intensity (operating frequency ≥30 kHz, energy density ≥300 W $cm^2$). By suitable adjustment of mixing medium and concentrations of the components, a particulation of the new chemosensors initially produced from conventional zeolites to the particle size distribution according to the invention is possible without thereby separating the chemosensors again, i.e. a potential separation of zeolite and dye/indicator does not take place. Thus, new chemosensors are provided, wherein the nanozeolites according to the invention with the particle size distribution according to the invention are doped with one or more functionalised dyes or functionalised indicators. Preferably, functionalised dyes/indicators are used whose functionalised end groups allow derivatisation/polymerisation within the zeolite cavities (bottle). The (e.g. dimerised or polymerised) large dye derivative (ship) formed in the cavities can no longer be displaced from the cavities due to massive steric hindrance of the zeolite walls. However, due to the almost two-dimensional geometry of the dyes/indicators, enough space remains within the wells for the analyte molecules to be investigated to penetrate and cause a signal difference.

Suitable functionalised dyes or indicators may be selected from the group of those having functionalised groups which allow the following reactions to take place between them:
Disulphide bridge formation
Maleimide-thiol reaction
Epoxy-thiol reaction/Epoxy-amine reaction
Haloacetamide or alkyl halide thiol reaction
Vinyl sulfone, acrylate/acrylamide thiol reaction
Amine isothiocyanate reaction
Aldehyde-amine reaction to hydrazone or imine
NHS ester with amine.

It may happen that the mechanically/sterically anchored dyes/indicators are slightly quenched within the cavities, but remain functional. The same applies to the mechanically/sterically anchored dyes/indicators in the presence of ions such as chloride ions (FIG. 7). These new chemosensors are particularly suitable for use in analytical determination methods that are fully functional with saline media such as PBS and artificial CSF or directly in biological media and endogenous fluids such as urine samples or in blood serum (FIGS. 8, 9 and 10).

With the known alumino-silicate-based chemosensors, the use in the determination of neutral analytes is also limited, since these cannot be bound due to the lack of charge and thus cannot be detected. When using chemosensors according to the invention, which are additionally characterised by the preferred Si/Al ratios defined above for the determination of neutral analytes, an improved balance between hydrophobicity and hydrophilicity is made possible. Thus, both positively charged dye/indicator molecules can be bound in the zeolite to form the signal-giving binding pockets, but also the neutral analyte molecules to be determined (FIG. 11). As shown in the following examples and figures, when using the new chemosensors with the Si/Al ratio of 10 defined as preferred for neutral analytes, preferably with an Si/Al ratio in the range of 10 to 20, binding and thus detection by UV-Vis spectroscopy is possible (FIGS. 12 and 13). Chemosensors with a significantly lower Si/Al ratio do not show any significant signal change when a neutral analyte, such as indole, is added (FIG. 11 above) and zwitterionic molecules, such as tryptophan, can only be detected at pH<3 due to the associated protonation of the analyte (guest).

In a further aspect, the invention thus also encompasses the novel chemosensors comprising monodisperse nanozeolites having a particle size distribution in the range of 5 to 400 nm, which may be further characterised by the features of the nanozeolites of the invention as defined herein, with doping with one or more functionalised dyes or indicators as described in detail above.

In another aspect, the invention further comprises the novel chemosensors described above in the form of a colloidal dispersion in an aqueous, physiological or biological medium, preferably one as defined above, or in the form of a layer, film or coating obtainable by spraying or aerosol printing, as described above.

Based on the foregoing, the monodisperse nanozeolites with the particle size distribution according to the invention described herein, as well as the new chemosensors according to the invention, are particularly suitable for the analytical methods described herein for the determination of neutral, zwitterionic or positively charged bioanalytes.

The new analytical methods of the present invention also enable the detection and qualitative and quantitative determination of analyte mixtures and the discrimination of different analyte ratios.

Consequently, in another aspect, the invention also comprises novel methods for the determination of neutral, zwitterionic and/or positively charged bioanalytes by UV-Vis or fluorescence spectroscopy, as defined herein, using monodisperse nanozeolites having a particle size distribution in the range of 5 to 400 nm, as defined herein, wherein the novel methods comprise the following steps:

i) Providing or preparing a dispersion of the monodisperse nanozeolites having a particle size distribution in the range of 5 to 400 nm, as defined herein, in an aqueous medium as defined herein, wherein the dispersion may already contain the bioanalytes to be determined (as in the case of determination directly in endogenous fluids);

ii) (otherwise) optionally, addition of the dispersion according to i) to the medium containing the bioanalytes to be determined, e.g. body fluids such as urine, saliva, blood, cerebrospinal fluid, etc., as defined above;

iii) optionally, preparing a layer, film or coating from the dispersion according to i) or ii) on a suitable carrier by means of a spraying process or aerosol printing process as described above;

iv) Determination of the bioanalytes in the dispersion according to i), ii) or in the layer, film or coating on the support according to iii) by means of UV-vis or fluorescence spectroscopy, preferably by means of UV-vis spectroscopy.

Prior to step i), the monodisperse nanozeolites can first be prepared from known zeolite materials by particulating them by sonication with high acoustic intensity (operating frequency ≥30 kHz, energy density ≥300 W cm$^2$) until they have a monodisperse particle size distribution in the range of 5 to 400 nm. The dispersion of the nanozeolites from step i) can additionally be subjected to sterile high-pressure filtration.

In addition, a step of doping the nanozeolites with functionalised dyes or indicators can be performed to obtain the new chemosensors described herein. In this case, in the case of preparation of the nanozeolites by sonication with high acoustic intensity (operating frequency ≥30 kHz, energy density ≥300 W cm$^2$), the dye or indicator doping can take place before or after sonication with high acoustic intensity.

(b) Enzyme kinetics using a sedimenting chemosensor: signal of the chemosensor without enzyme addition in the presence of a non-binding guest (upper curve), signal of the chemosensor with enzyme addition and thereby conversion of the non-binding guest to a binding guest (lower curve).

FIG. 2 (a) Comparison of the particle size distribution of a nanozeolite according to the invention with that of a commercially available zeolite (zeolite $Y_{15}$)

(b) Enzyme kinetics using a chemosensor according to the invention: signal of the chemosensor without enzyme in the presence of a non-binding guest (upper curve), signal of the chemosensor with enzyme and thereby conversion of the non-binding guest to a binding guest (lower curve).

FIG. 3 (a) Comparison of the particle size of a commercial zeolite $L_{3.0}$ with the particle size of a nanozeolite produced from this commercial zeolite by sonication with high sound intensity (operating frequency ≥30 kHz, energy density ≥300 W cm$^2$) and high pressure filtration.

(b) Zoom-In

FIG. 4 Absorption spectra of chemosensors according to the invention, which show a signal change in the UV-Vis spectra when positively charged analytes (guests) are added.

(a) analyte: serotonin (b) analyte: dopamine (c) Detection and differentiation of various dopamine-serotonin mixtures by UV-vis spectroscopy.

Figure 5:
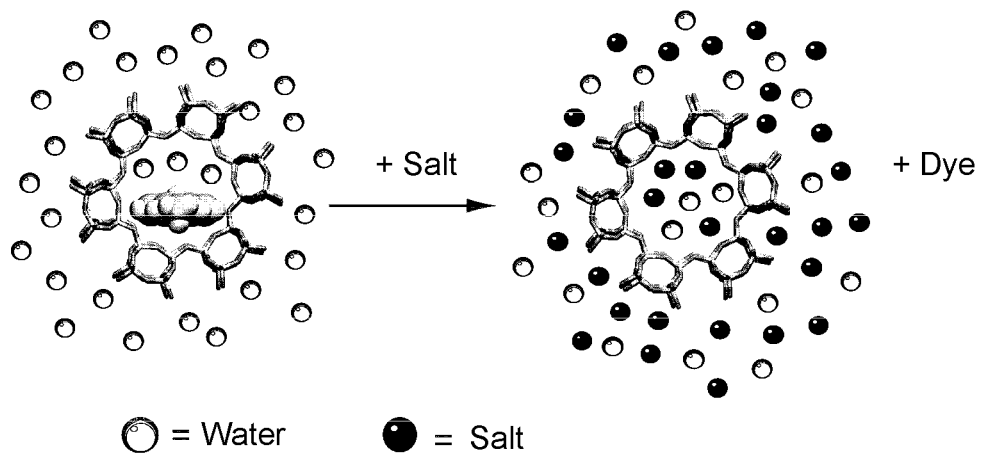

FIG. 5 Schematic representation of the cation exchange reaction that leads to the decomposition of conventional chemosensors in biological (relevant) media such as PBS or urine. The dye is forced out of the carrier material by the high salt concentration and the signal-generating binding pockets are no longer available for the detection of the analytes.

Figure 6:
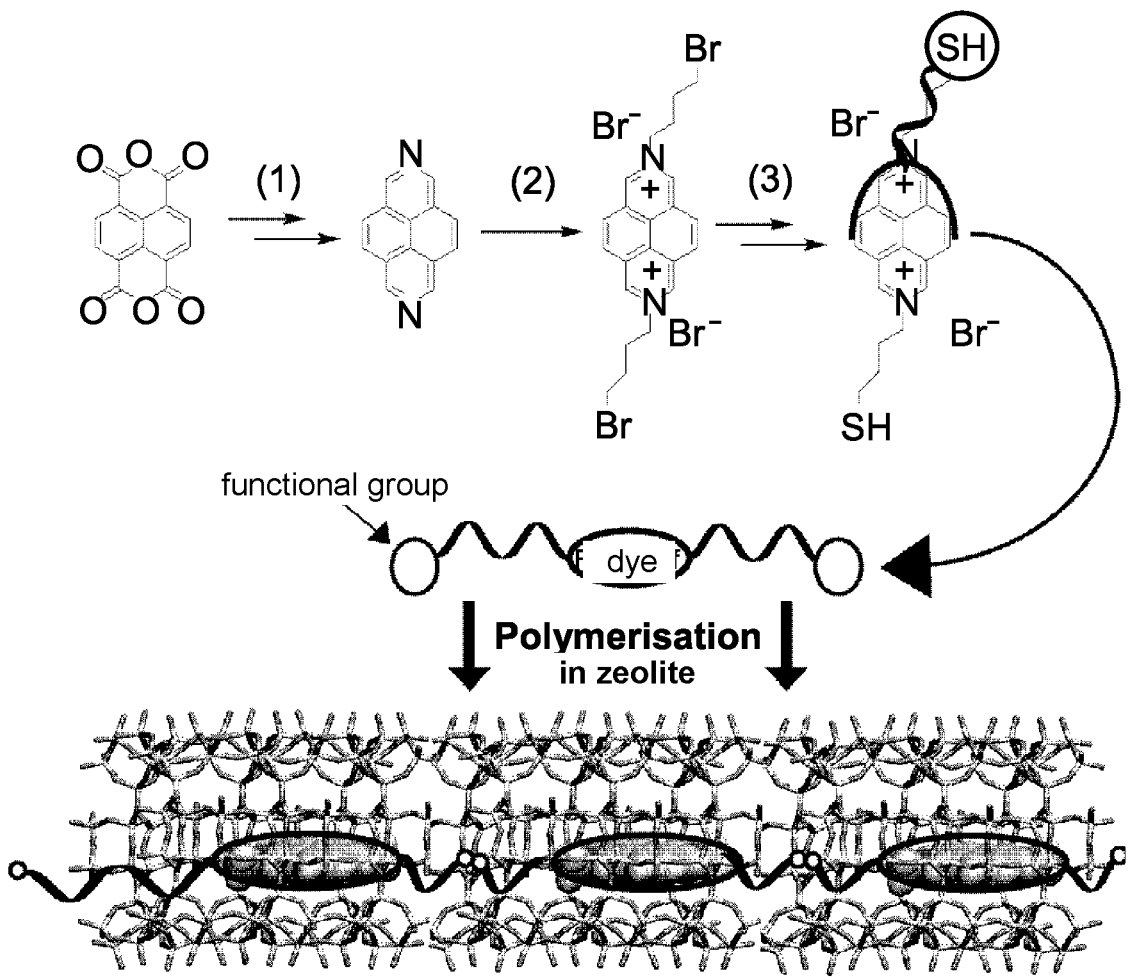

FIG. 6 Schematic representation of a chemosensor according to the invention based on a nanozeolite according to the invention doped with functional dyes, wherein the dye molecules are functionalised with functional groups, linked or polymerised with one another by bonding or polymerisation after loading of the zeolite and thus sterically or mechanically anchored in the zeolite cavities.

Figure 7:
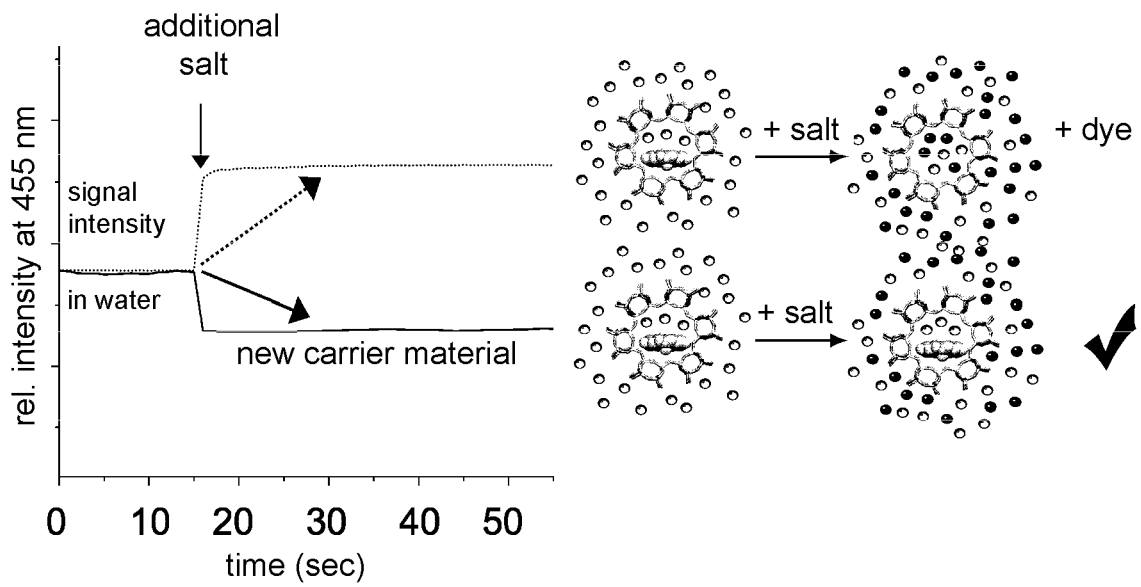

FIG. 7 Investigation of the influence of high salt concentrations in the test medium on the signal strength when using conventional chemosensors compared to the new chemosensors according to the invention. The signal increase after the addition of salt signals the escape of the dye molecules and thus the cancellation of the slight quenching by the zeolite cavities. The chemosensor is no longer functional (top). The signal decrease of the new carrier material after salt addition confirms the interaction of the derivatised dyes with the added ions. The binding pockets nevertheless remain (bottom).

Figure 8A:
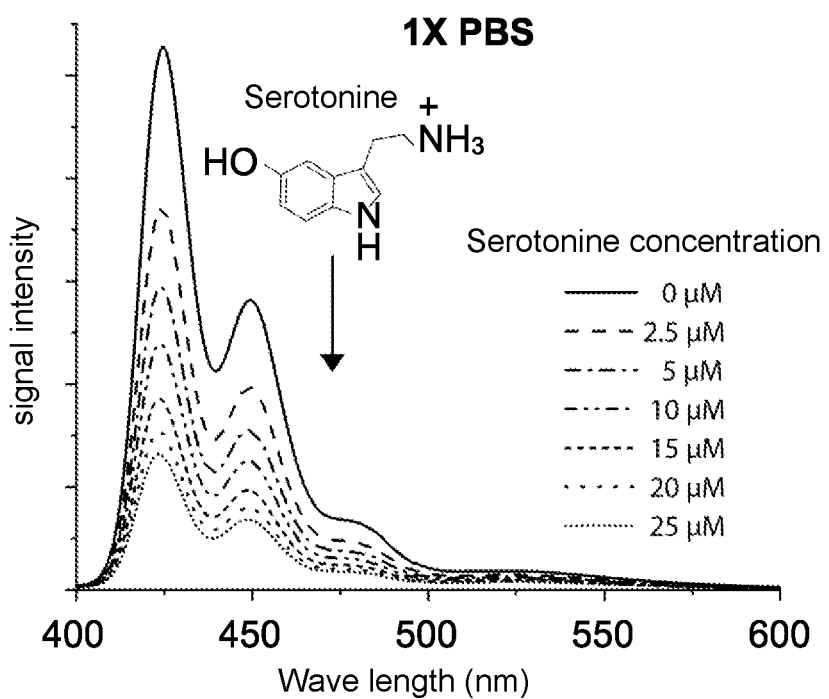
Figure 8B:
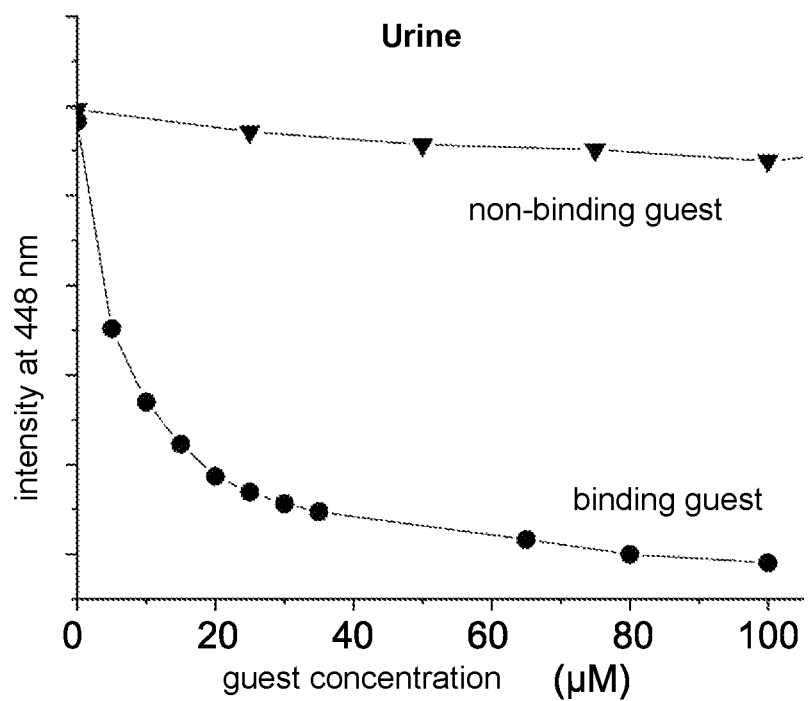

FIG. 8 Detection of different analytes (guests) in physiological or biological media
  (a) Detection of serotonin in 1×PBS corresponding to a physiological salt concentration of sodium chloride of 137 mM.
  (b) discrimination of different analytes (guests) in human urine from volunteers FIG. 9 Detection of different analytes (guests) in physiological or biological media
  (a) Detection of serotonin in artificial CSF
  (b) Recording the enzymatic conversion of non-binding L-tyrosine to binding tyramine using the new chemosensor according to the invention in artificial cerebrospinal fluid.

Figure 10A:
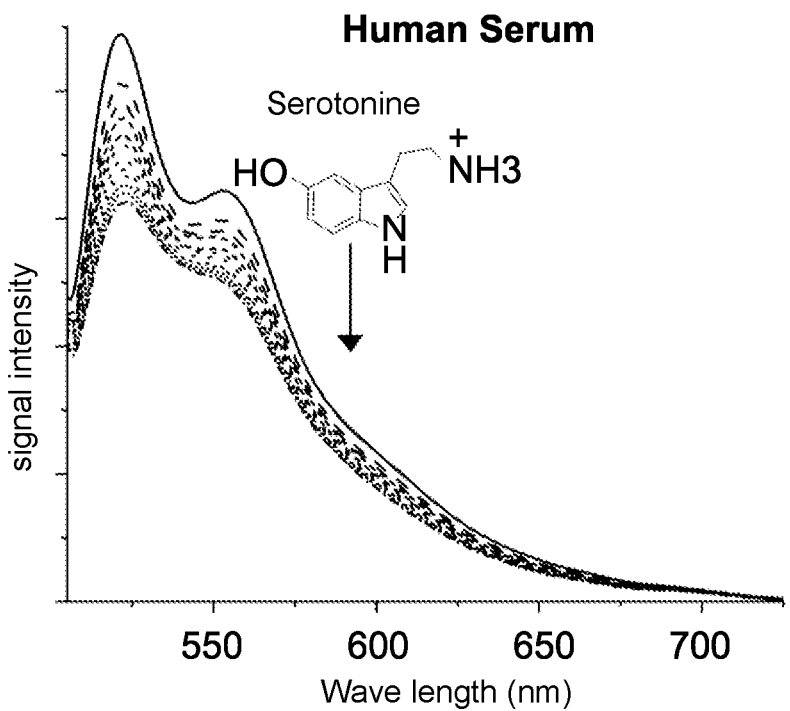
Figure 10B:
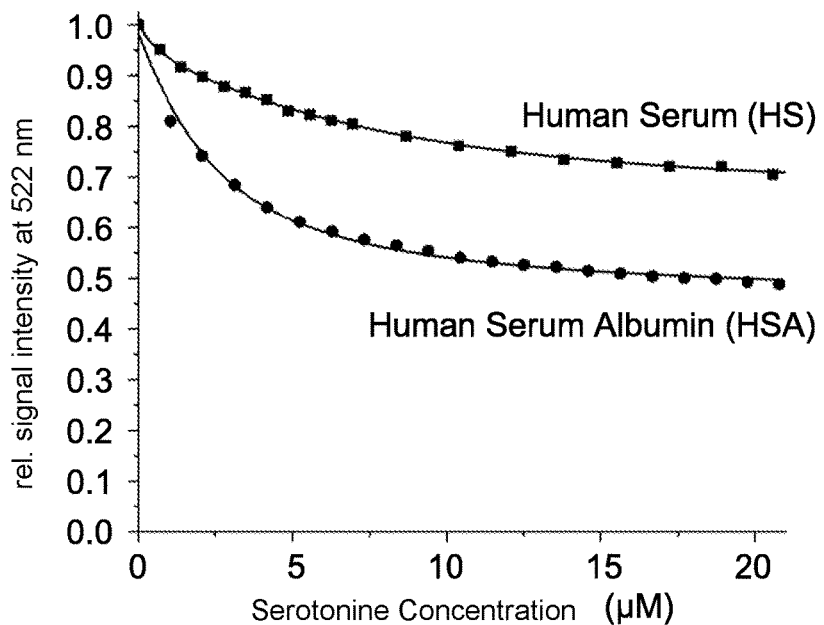

FIG. 10 (a) Detection of serotonin in blood serum (human serum, HS, diluted 1:2 with 50 mM HEPES).
  (b) Detection of serotonin in blood serum (human serum, HS, diluted 1:2 with 50 mM HEPES, top) or in the presence of the protein human albumin (human serum albumin, HSA, bottom).

Figure 11:
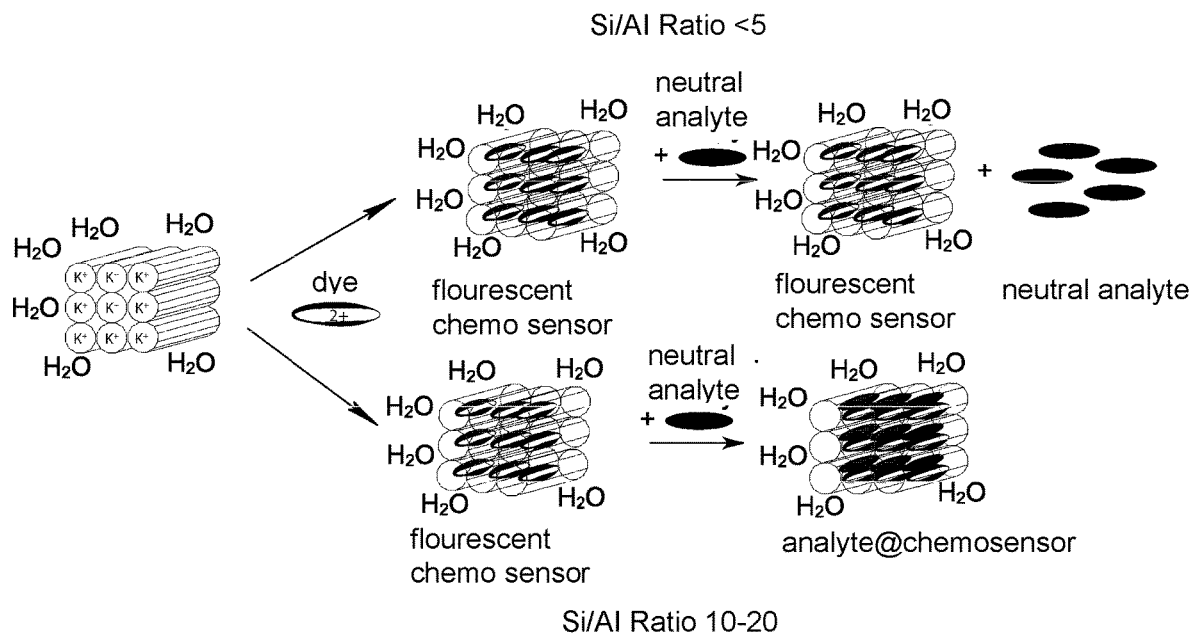

FIG. 11 Schematic representation of the non-binding of neutral analytes (guests) to conventional zeolite-based chemosensors and the binding to the new chemosensors according to the invention with a balance between hydrophobicity and hydrophilicity.

Figure 12A:
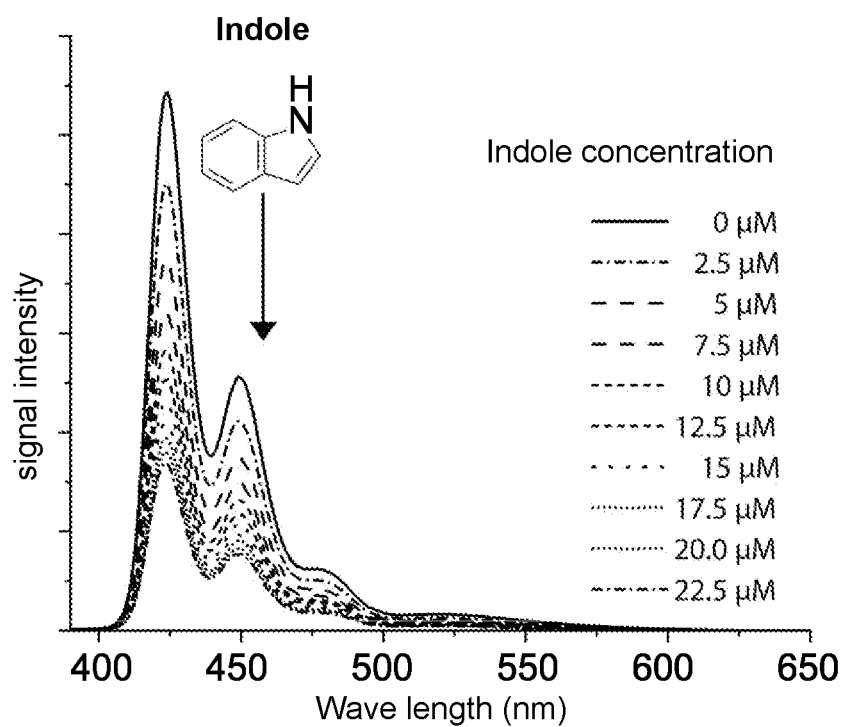
Figure 12B:
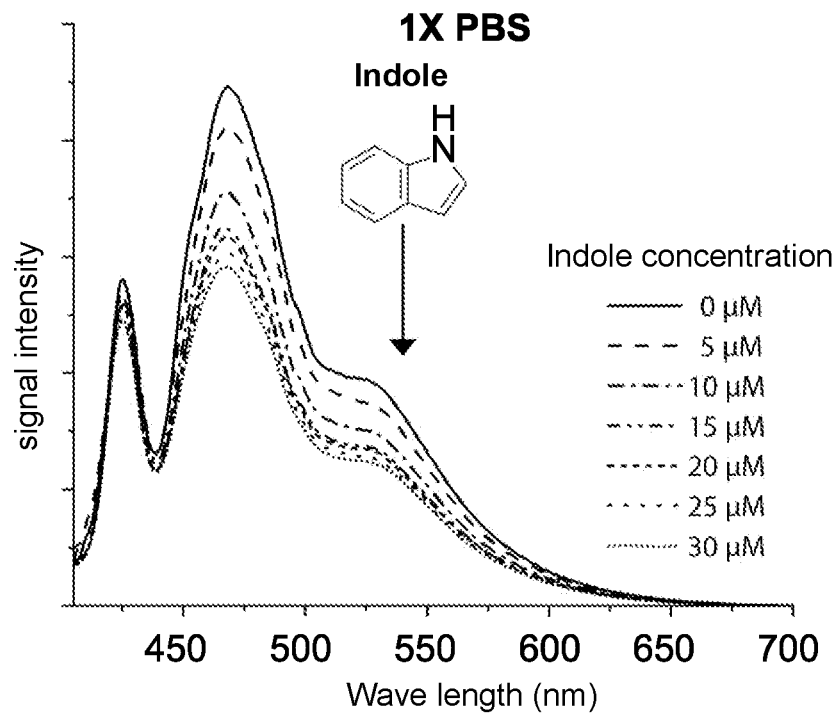
Figure 12C:
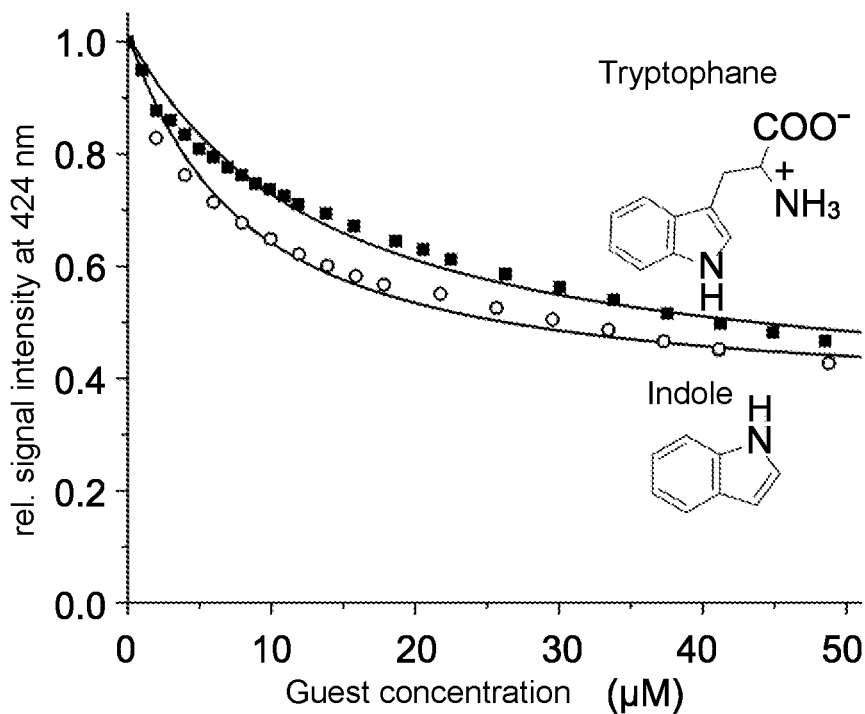
Figure 13:
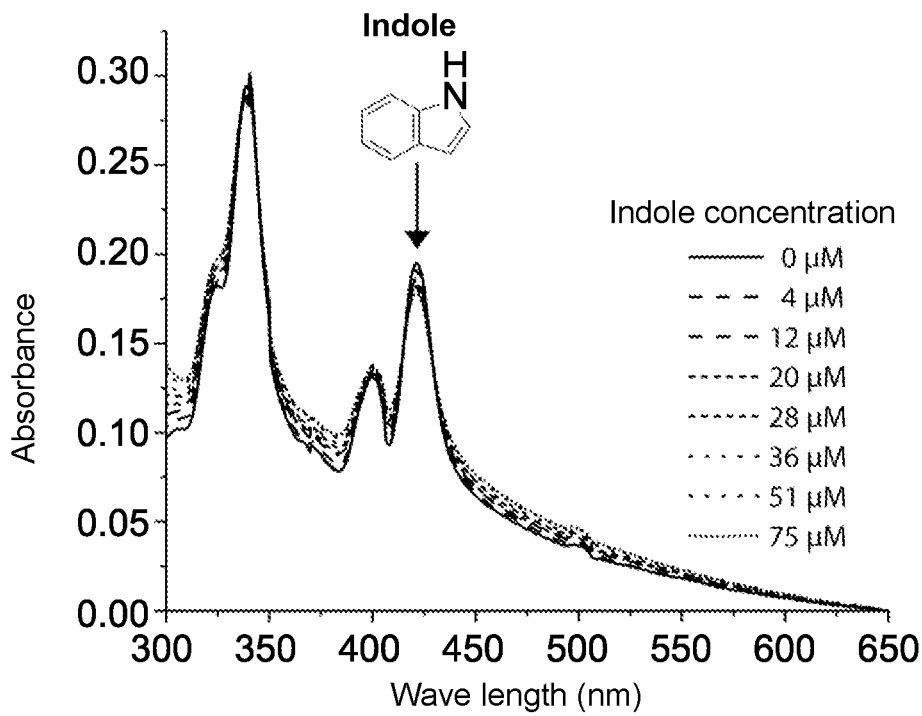

FIG. 12 (a) Detection of the neutral analyte indole by means of a new chemosensor according to the invention with binding of the indole molecules in the binding pockets formed by the dye molecules with signal reduction due to interaction;
  (b) Detection of the neutral analyte indole by means of a new chemosensor according to the invention with binding of the indole molecules in 1×PBS, corresponding to a physiological salt concentration of sodium chloride of 137 mM.
  (c) Detection of the zwitterionic analyte tryptophan (top) and the neutral analyte indole (bottom) by means of the new chemosensor according to the invention with signal reduction through interaction with the dye. Plot related to a selected wavelength for the determination of binding affinity FIG. 13 Detection of the neutral analyte indole using a new chemosensor according to the invention and UV-vis spectroscopy The present invention is described in more detail by the following examples, but without being limited thereto.

EXAMPLES

Example 1—Sedimentation Studies on Commercially Available Zeolites a) Dye Detection In a commercially available zeolite (zeolite $Y_{15}$-Si/Al ratio=15; particle size distribution 400-1700 nm according to DLS (description of the method under example 2), twofold positively charged, diazapyrene-based dye molecules were deposited in the cavities according to conventional procedures and the decrease in intensity of the dye due to sedimentation of the zeolite was detected by determining the dye intensity after 0 h, 5 h and 8 h using liquid phase spectroscopy.

The measurement was carried out under the following conditions: The loading of the zeolite materials used with dye was always chosen in a range of 0.23-2.3 wt % dye relative to the zeolite material. In the present example, the dye loading is 0.23 wt % relative to the zeolite material and the concentration of the chemosensor in the dispersion is 250 µg/ml. For preparation, zeolite and dye were mixed, centrifuged (8000 rpm, 5 min) and the material was washed three times with 10 mL MilliQ water. By measuring and dye concentration determination of the wash solutions and under known initial concentration, the dye loading could be accurately determined. Measurements were performed on a Jasco FP-8300 fluorescence spectrometer using a 450 W xenon lamp with a Platereader attachment. The storage of the dispersion-filled plates between the measurements was carried out under exclusion of light at room temperature. Excitation was at 371 nm, detection at 424 nm.

Figure 1A:
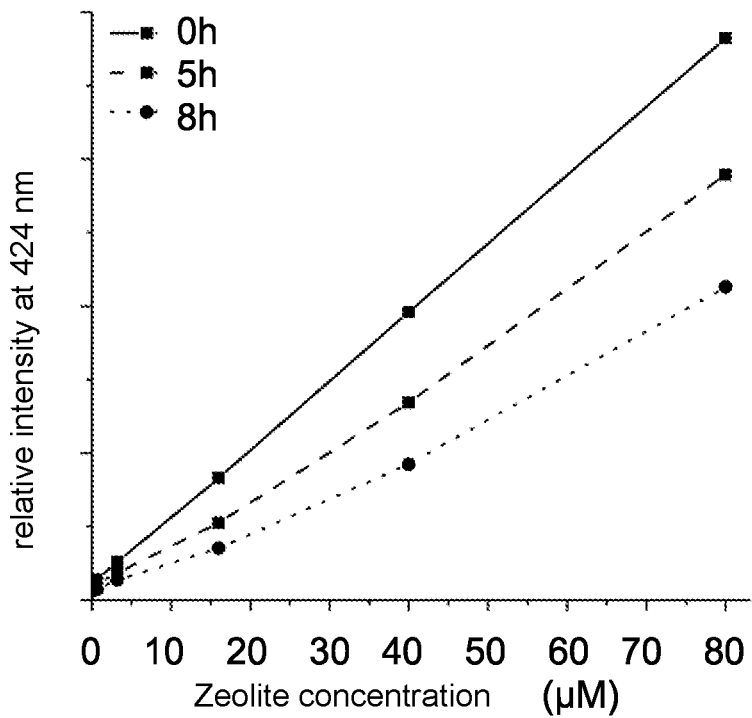
FIG. 1 (a) Sedimentation process of a commercial zeolite (zeolite $Y_{15}$-Si/Al ratio=15) by means of dye detection and liquid phase spectroscopy under determination of the intensity decrease of the dye in the course of time by sedimentation of the zeolite in which the dye molecules are embedded.

FIG. 1*a* clearly shows that the intensity of the dye decreases over time due to sedimentation of the zeolite in which the dye molecules are embedded.

b) Enzyme Kinetics

By adding an enzyme (tyrosine decarboxylase, TDC) to a dispersion of a commercial zeolite loaded with unbranched, positively charged dye molecules (as described in Example 1a) and a solution of non-binding L-tyrosine, the formation of an analyte that quenches the sensor signal was stimulated. The signal intensity over time was measured.

The measurement was carried out under the following conditions: The chemosensor was prepared using the procedure described in 1a (dye loading 2.3 wt %) and then diluted with 10 mM HEPES buffer (pH 6.2) to a chemosensor concentration of 550 µg/ml. The zeolite used was $L_{3.0}$, and the dyes were the doubly positively charged diazapyrene-based molecules. In addition, an enzyme cofactor (pyridoxal-5-phosphate, PRP) and 500 µM L-tyrosine as a non-binding analyte were added to this dispersion. After incubation at 37° C. for 30 minutes, the dispersion was dispersed again and then measured on a Jasco FP-8300 in disposable cuvettes (top) or after the addition of the enzyme tyrosine decarboxylase (TDC, 33 µg) in disposable cuvettes (bottom). TDC catalyses the conversion of the non-binding L-tyrosine to the binding tyramine. Excitation took place at 300 nm, emission at 500 nm.

Figure 1B:
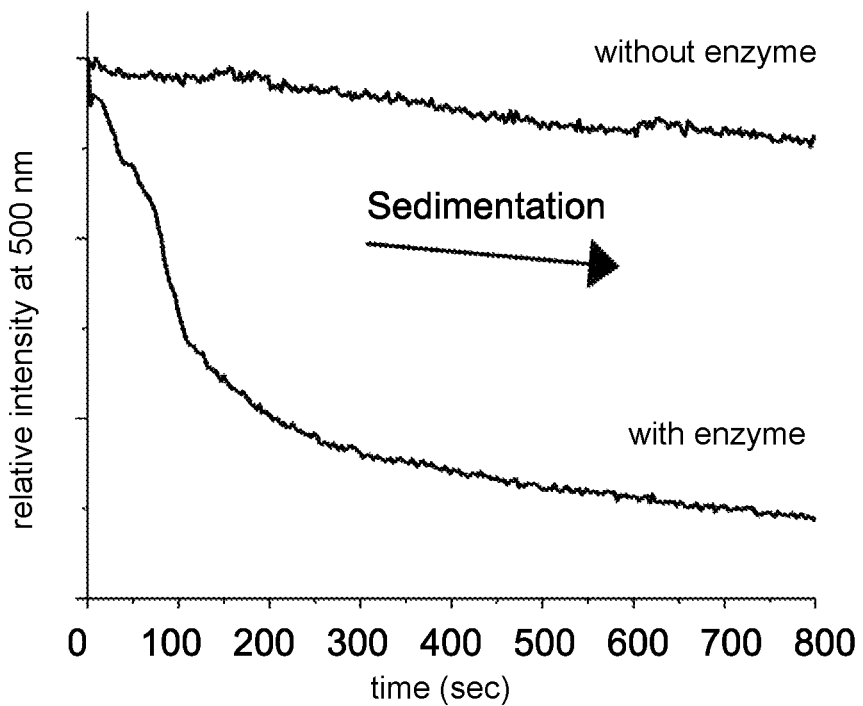

FIG. 1*b* shows that already over a period of 10 minutes there is a clear decrease in intensity due to sedimentation. Slower enzymatic reactions would therefore be masked by the baseline drift and thus not analysable. The signal curve with enzyme also shows undesired noise, which means that no Michaelis-Menten kinetics can be fitted. Furthermore, the measurement was limited to HEPES buffers as analysis medium, since the biologically relevant sodium phosphate buffers led to disintegration of the chemosensor (in this case conventional zeolite $L_{3.0}$ without prior treatment by a rod sonicator/filtration).

Figure 2A:
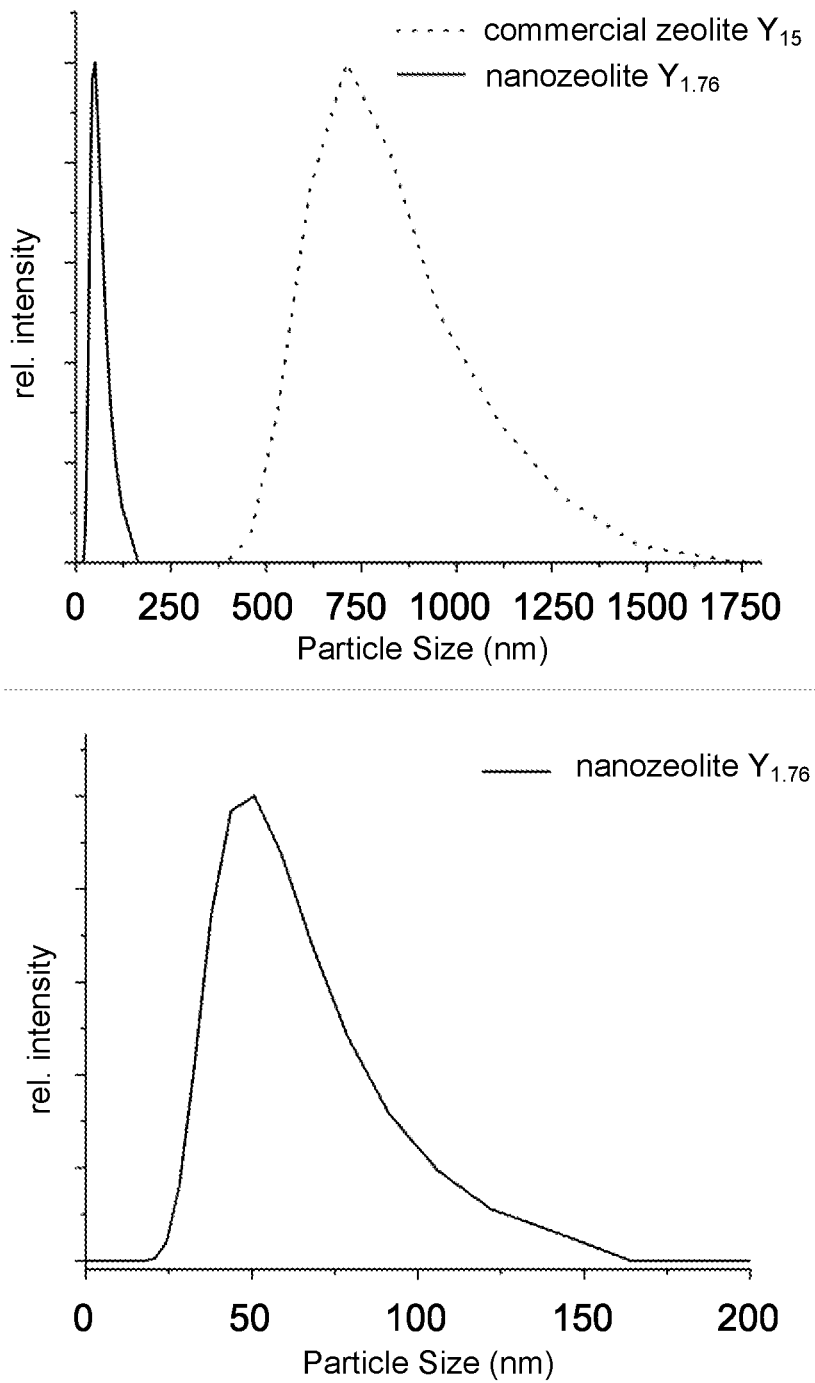

Example 2—Particle Size Distribution and Sedimentation Studies on Zeolites According to the Invention a) Particle Size Distribution A comparison of the particle size distribution of a nanozeolite according to the invention (nanozeolite shown here with an Si/Al ratio of 1.76) with that of a commercially available zeolite (zeolite $Y_{15}$; Si/Al=15) is shown in FIG. 2a.

The particle size distribution was determined using dynamic light scattering (DLS) on a Malvern ZetaSizer Nano ZS from Malvern Panalytics in acrylic disposable cuvettes in water. For this purpose, the dispersions were prepared analogously to the procedure described under 1a.

b) Enzyme Kinetics

As in Example 1 b, by adding an enzyme (tyrosine decarboxylase, TDC) to a chemosensor according to the invention based on the nanozeolite according to the invention used in Example 3b, the formation of an analyte quenching the sensor signal was simulated and the intensity over time was measured by means of enzyme kinetics. Zeolite $L_{3.0}$ was used as the carrier material, which was homogenised after dispersion by using a rod sonicator with very high acoustic intensity (operating frequency ≥30 kHz, energy density ≥300 W $cm^2$) and subsequent high-pressure filtration. Dye loading was performed as described in Example 1, although this can be carried out either before or after homogenisation (in the example shown, this was done before homogenisation). Further conditions of the enzyme monitoring can be taken from example 1 b.

Figure 2B:
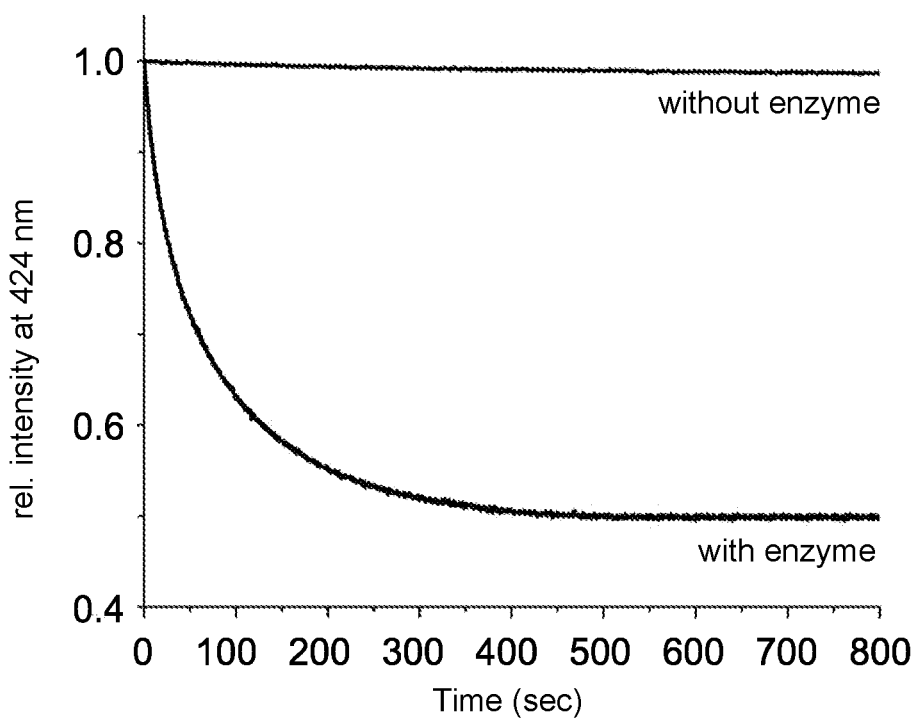

The comparison of FIG. 2b with FIG. 1b shows that the chemosensors according to the invention can detect kinetic curves with low noise and good fit.

Example 3—Preparation of a Nanozeolite According to the Invention and a Chemosensor According to the Invention a) Preparation of a Nanozeolite According to the Invention by Sonication with High Acoustic Intensity A nanozeolite according to the invention with a particle size distribution of 80-500 with agglomerated particles with sizes up to 6500 nm was prepared from a commercially available zeolite (zeolite $L_{3.0}$) with a particle size distribution of 80-500 with agglomerated particles with sizes up to 6500 nm by the method according to the invention using sonication with high intensity (working frequency ≥30 kHz, energy density ≥300 W $cm^2$) and subsequent sterile high pressure filtration.

The preparation was carried out under the following conditions: The commercial zeolite material was dispersed in water and measured using dynamic light scattering (DLS) on a Malvern ZetaSizer Nano ZS from Malvern Panalytics. Subsequently, the dispersion was sonicated for 15 min at high intensity using a rod sonicator and the remaining large particles were separated using high-pressure filtration. These process steps can also be applied after the introduction of the dye. For this purpose, the dispersions are prepared analogously to the procedure described under 1a.

Figure 3A:
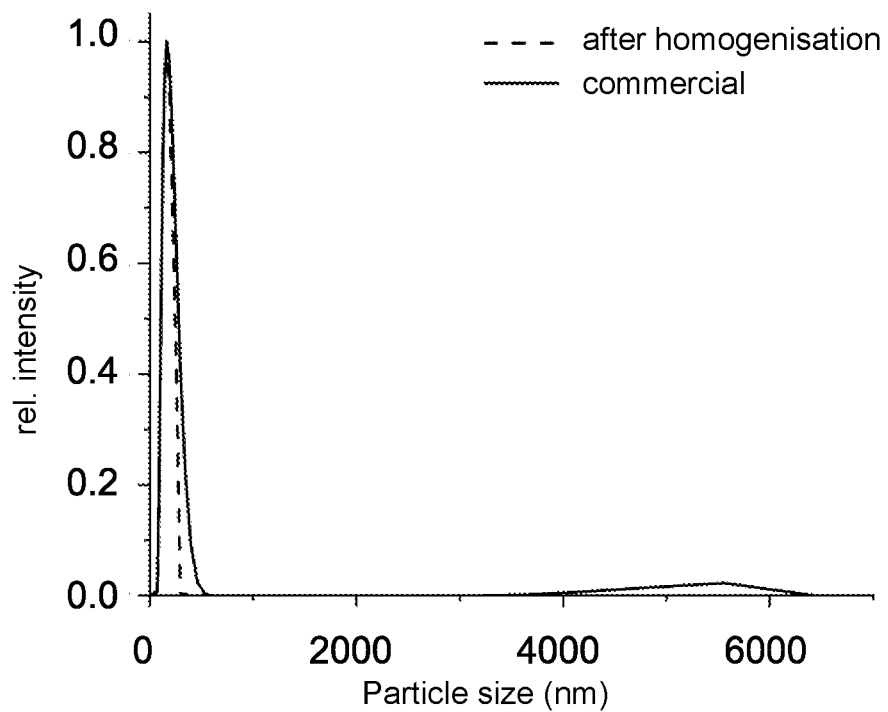
Figure 3B:
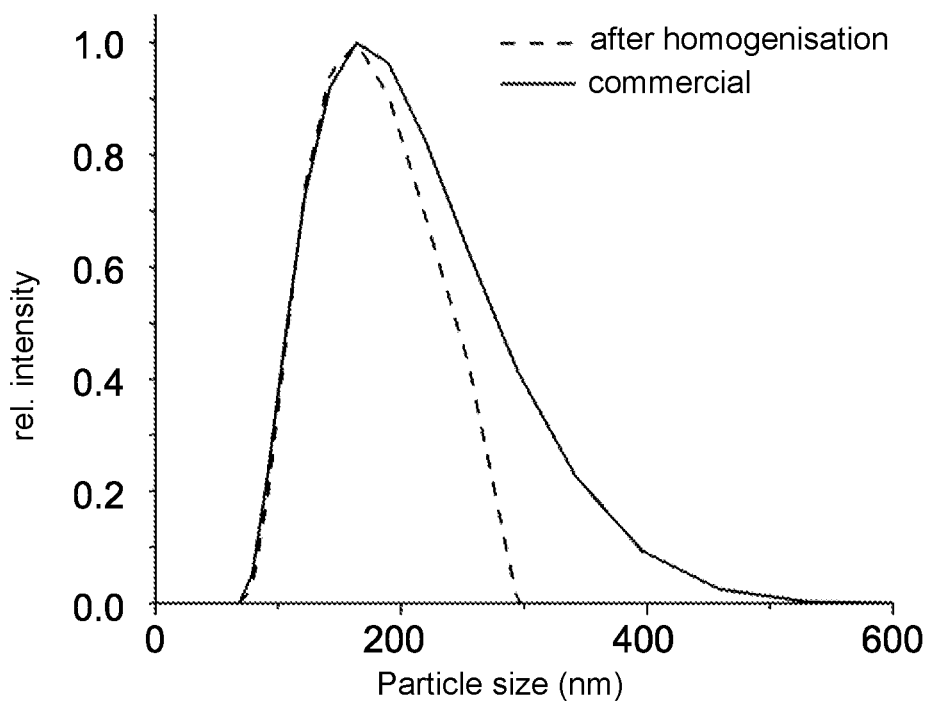

The comparison result is shown in FIGS. 3a and 3b.

b) Manufacture of a Chemosensor According to the Invention

The preparation of a chemosensor based on the nanozeolites of the invention with a doping of functionalised dyes or indicators is described below: Previously used dye molecules did not have any linking/polymerisation possibilities. As an example, 2,7-dimethyldiazapyrenium dibromide can be mentioned here. By adding linker molecules, as explained in more detail in Example 5 and FIG. 6, the possibility of linking within the cavities is given. However, the original zeolite loading is the same for all dye molecules: the dye is placed in aqueous solution at a known concentration, and the zeolite material used is dispersed in water. The dye loading was always chosen in a range of 0.23-2.3 wt % dye related to the zeolite material and accordingly dispersion and dye solution were mixed, centrifuged (8000 rpm, 5 min) and the material was washed three times with 10 mL MilliQ water and centrifuged again. By measuring the wash solutions and under known initial concentration, the dye loading could be accurately determined. The measurements were performed on a Jasco FP-8300 fluorescence spectrometer using a 450 W xenon lamp with a Platereader attachment. The resulting chemosensor material can be stored in solution or as a solid. In order to trigger polymerisation within the zeolite cavities, an external influence must be changed (at least to achieve wide branching). For example, polymerisation via disulphide bonding (see FIG. 6a) is triggered by the supply of oxygen, while the thiol-maleimide reaction, for example, is favoured by the supply of temperature.

Example 4—UV-Vis Determination of Serotonin and Dopamine with the New Chemosensors According to the Invention Using a new chemosensor prepared according to Example 3 using the method of the invention, the positively charged bioanalytes serotonin and dopamine were determined by UV-Vis detection.

The measurement was carried out under the following conditions: The chemosensors were prepared according to the procedure described in 3b and 2000 μL of the prepared dispersions were measured in disposable cuvettes. Subsequently, 1 mM stock solutions of the analytes to be determined were titrated in 1-10 μL steps under stirring and the corresponding UV-Vis spectra were recorded. All experiments were carried out at 25° C.

Figure 4A:
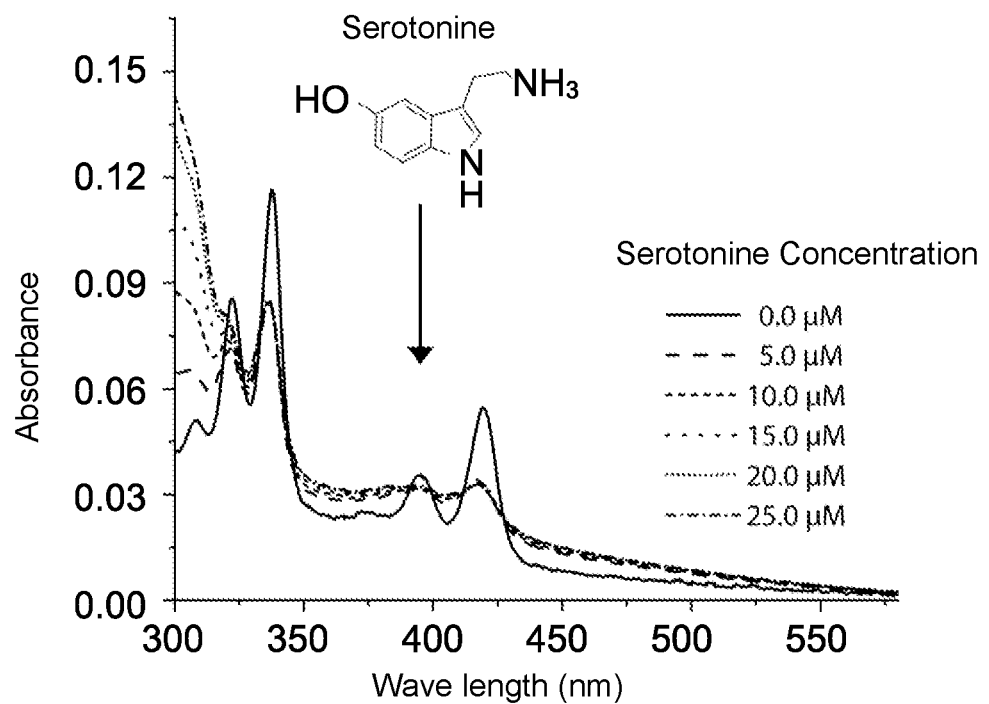
Figure 4B:
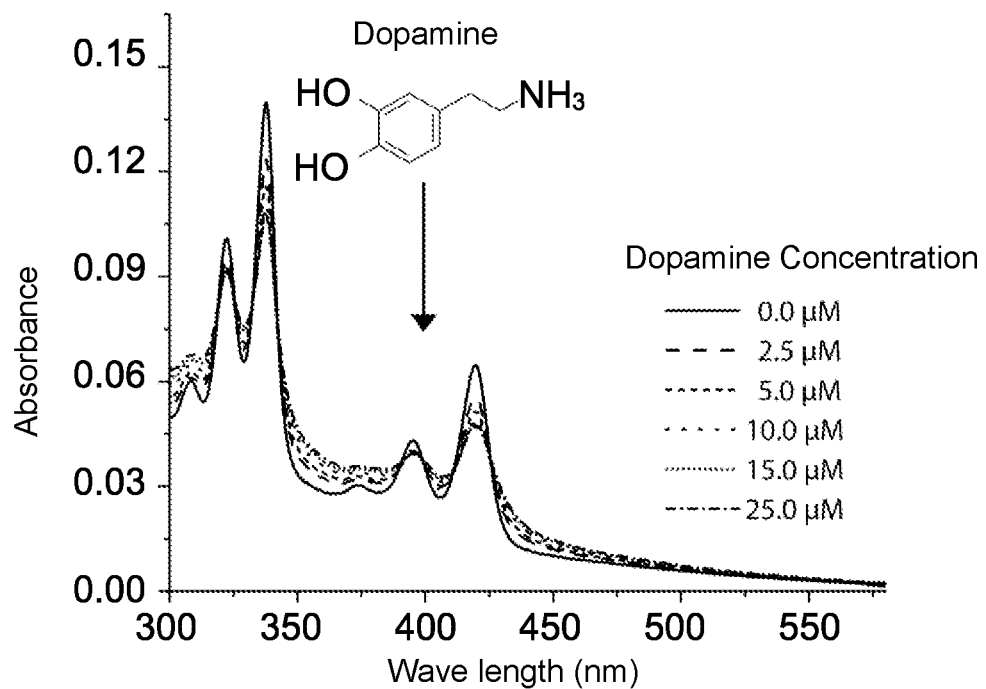
Figure 4C:
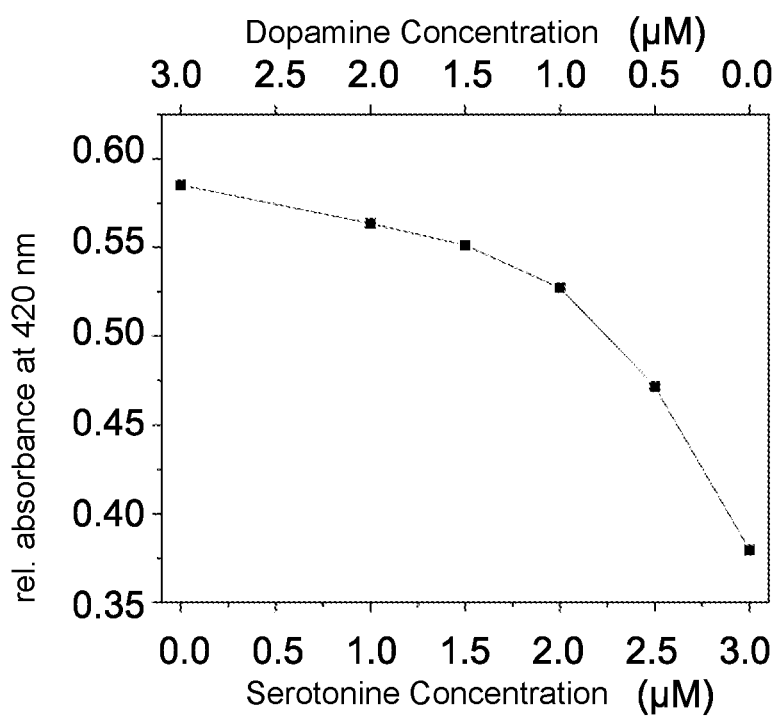

FIGS. 4a, 4b and 4c show that the process according to the invention and the nanozeolites obtainable therefrom allow the new chemosensors according to the invention to be produced with a lower scattering effect, thus enabling the UV-Vis determination of bioanalytes.

Example 5—Influence of Salt Concentration on Zeolite-Based Chemosensors

To demonstrate the influence of high salt concentrations in the test medium on the signal strength, a conventional chemosensor based on zeolite $L_{3.0}$ with a doubly positively charged, diazapyrene-based dye without linkages and a new chemosensor according to the invention based on zeolite $L_{3.0}$ with a doubly positively charged, diazapyrene-based dye with linkages of the individual dye units by means of polymerisation according to example 3b were compared. The change in signal intensity due to the release of the incorporated dye after the addition of salt to the test medium was measured.

The measurement was carried out under the following conditions: In both cases, the chemosensors were prepared according to the steps mentioned in 3b. In both cases the dye loading of the zeolite was 2.3 wt %. FIG. 6 shows the synthesis pathway of one of the functionalised dyes—the polymerisation was carried out as described in example 3b. After equilibration, the stability of the fluorescence signal (excitation at 371 nm, emission at 455 nm) was detected by means of kinetics measurement and then a highly concentrated PBS solution was added so that the concentration of 1×PBS (137 mM NaCl) was reached in the cuvette.

FIGS. 5 and 6 schematically show the underlying principle of the cation exchange reaction in conventional chemosensors compared to the new chemosensors according to the invention.

FIG. 7 shows a clear increase in fluorescence intensity after the addition of salt to conventional chemosensors, which signals the escape of the dye molecules and thus the elimination of the slight quenching by the zeolite cavities. The chemosensor is thus no longer functional (FIG. 7, upper curve). The reduction of the signal intensity after the addition of salt when using a new chemosensor according to the invention with dye molecules mechanically anchored therein confirms the interaction of the derivatised dyes with the added ions. However, the chemosensor remains intact due to the mechanical anchoring and the dye molecules cannot be displaced.

Example 6—Determination of Positively Charged Analytes in Physiological Media with a New Chemosensor According to the Invention The new chemosensor according to the invention in Example 3b was used for the determination of positively charged analytes in various physiological media with high salt concentration.

The measurements were carried out under the following conditions: The chemosensors used were prepared in water according to the steps described under 3b and then mixed with the medium in which the investigation was to take place. It is possible that the analyte to be examined is already present in the medium (this is the case, for example, with urine from volunteers) or that the analyte to be examined is first added (this is the case, for example, with artificial cerebrospinal fluid). If the analyte is already present in the medium, a stock solution of serotonin was further added until all dye molecules within the chemosensor were quenched (concentration of these is known) and the difference between the concentration of the dye molecules and the concentration of the added analyte then corresponds to the original serotonin concentration in the medium.

The measurement was carried out under the following conditions: FIG. 8

(a) The chemosensor based on zeolite $L_{3.0}$ and with a dye loading/polymerisation as described in examples 3b and 5 was dispersed in water and then mixed with 1.5×PBS (final concentration 1×PBS). The addition of the non-binding or binding guest was carried out as explained in example 4. Detection was carried out in disposable cuvettes (PP) using a fluorescence spectrometer.

(b) The chemosensor based on zeolite $L_{3.0}$ and with a dye loading/polymerisation as described in FIG. 6 was dispersed in 50 mM HEPES buffer (pH 6.2) and then mixed 4:1 with the urine of the volunteers and measured by Platereader assay. The addition of the non-binding or binding guest was performed as described in example 4.

FIG. 9

(a) The chemosensor based on zeolite $L_{3.0}$ and with a dye loading/polymerisation as described in examples 3b and 5 was originally prepared in water as medium, dried and then dispersed in artificial CSF. The artificial CSF used does not contain detectable neurotransmitters. The addition of the non-binding or binding guest was carried out as explained in Example 4. Detection was carried out in disposable cuvettes (PP) using a fluorescence spectrometer.

(b) The chemosensor was prepared as described in example 9a and the enzyme reaction was carried out as explained in example 1b. Detection was performed in disposable cuvettes (PP) using a fluorescence spectrometer.

FIG. 10

(a) The chemosensor based on zeolite $L_{3.0}$ was prepared with dye loading/polymerisation as described in examples 3b and 5 in 50 mM HEPES as medium. The human serum was diluted 1:2 with 50 mM HEPES (final concentration approx. 500 µM HS) and mixed with a chemosensor dispersion (final concentration 250 µg/ml). Subsequently, serotonin was titrated as explained in example 4. Excitation at 420 nm, detection at 522 nm. Detection was carried out in disposable cuvettes (PP) using a fluorescence spectrometer.

(b) The chemosensor based on zeolite $L_{3.0}$ was prepared with dye loading/polymerisation as described in examples 3b and 5 in 50 mM HEPES as medium. Human serum albumin was filtered (22 mM syringe filter, PP) and mixed with chemosensor dispersion (final concentration 250 µg/ml). Serotonin was then titrated as explained in example 4. Detection was carried out in disposable cuvettes (PP) using a fluorescence spectrometer. Excitation at 420 nm, detection at 522 nm.

Figure 9A:
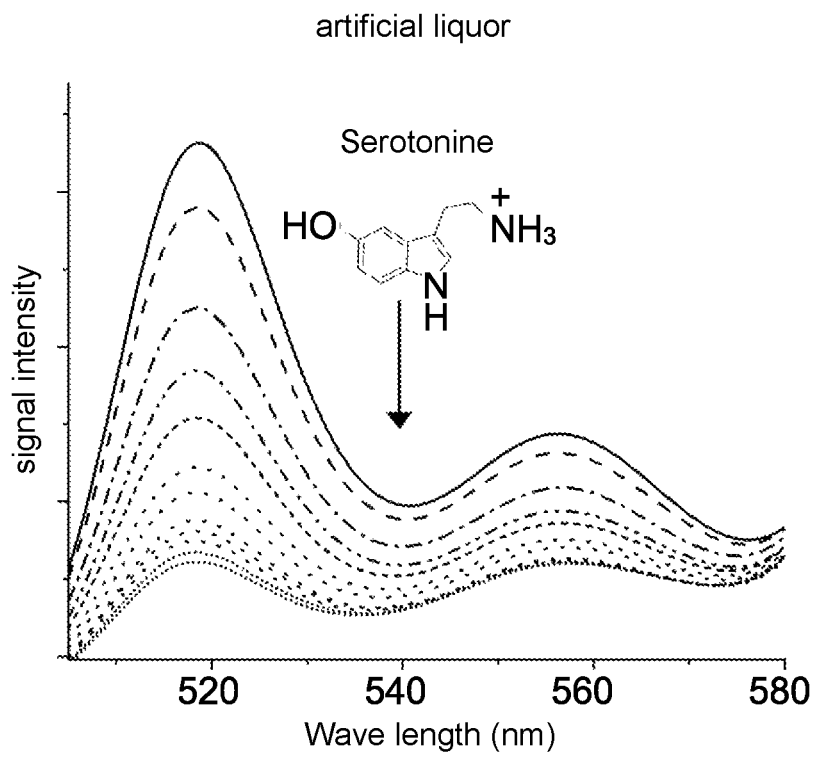
Figure 9B:
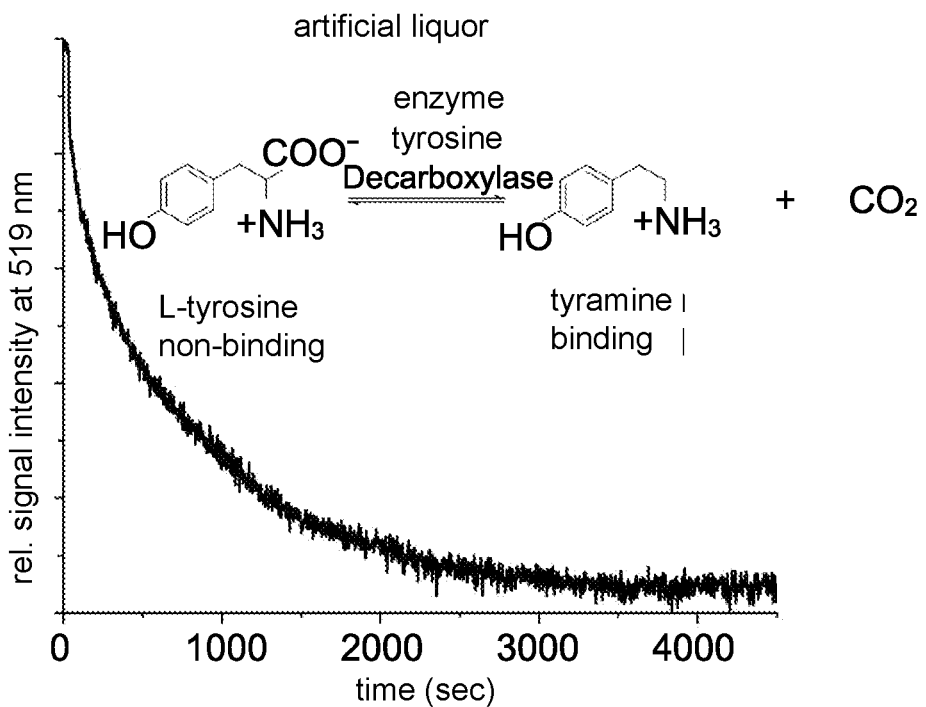

The result is shown in FIGS. 8, 9 and 10 for different media and different analytes. The new chemosensors according to the invention can thus be used in biological media such as PBS or artificial cerebrospinal fluid, but also directly in endogenous fluids with a high salt concentration, such as urine or blood serum.

Example 7—Determination of Neutral and Zwitterionic Analytes with a New Chemosensor According to the Invention The new chemosensor according to the invention based on homogenised zeolite $Y_{15}$ according to example 3b was used for the determination of neutral and zwitterionic analytes.

The measurements were carried out under the following conditions: The chemosensors were prepared based on the procedure described in 3b. Then chemosensor concentrations of 250 µg/ml with a relative dye loading of 2.3 wt % were adjusted in water and the neutral or zwitterionic analyte to be determined (1 mM stock solution in each case) was titrated. Analogously, the experiment could also be carried out in 1×PBS. Detection was carried out in disposable cuvettes (PP) using a fluorescence spectrometer.

FIG. 11 schematically shows the underlying principle of binding in chemosensors with different Si/Al ratios. The result of the determinations is shown in FIGS. 12a, 12b, 12c and 13.

The invention claimed is:

1. A method of determination of at least one of (i) neutral, (ii) zwitterionic and (iii) positively charged bioanalytes comprising
    (a) contacting at least one of (i) neutral, (ii) zwitterionic and (iii) positively charged bioanalytes in an aqueous medium with a chemosensor comprising monodisperse nanozeolites having a particle size distribution in the range of 5 to 400 nm doped with at least one of functionalized dyes and indicator molecules which are sterically anchored in the cavities of the monodisperse nanozeolites, wherein the bioanalytes become chemically and/or sterically bound to the nanozeolite-chemosensors, to form a bioanalyte-nanozeolite complex, and
    (b) analyzing said bioanalyte-nanozeolite complex with UV-Vis or fluorescence spectroscopy.

2. The method of claim 1, wherein the monodisperse nanozeolites have a particle size distribution in the range of 5 to 200 nm.

3. The method of claim 1, wherein the monodisperse nanozeolites comprise Si and Al, and wherein the Si/Al ratio is within the range of 0.5 to 50.

4. The method of claim 2, wherein the monodisperse nanozeolites comprise Si and Al, and wherein the Si/Al ratio is within the range of 0.5 to 50.

5. The method of claim 1, wherein the chemosensors comprising the doped monodisperse nanozeolites are comprised in an aqueous colloidal dispersion, or comprised in a layer, film or coating obtained by spraying or aerosol printing an aqueous colloidal dispersion of the chemosensors comprising the doped monodisperse nanozeolites.

6. The method of claim 1, wherein the chemosensors comprising the doped monodisperse nanozeolites and the bioanalytes are comprised in an aqueous colloidal dispersion, or comprised in a layer, film or coating obtained by spraying or aerosol printing an aqueous colloidal dispersion of the chemosensors comprising the doped monodisperse nanozeolites and the bioanalytes.

7. The method of claim 1, wherein the bioanalytes to be determined are biogenic and bioactive molecules selected from the groups of hormones, lipids, metabolites, neurotransmitters and bioactive agents.

8. The method of claim 7, wherein the bioanalytes to be determined are selected from the group consisting of serotonin, dopamine, tryptamine, tyramine, epinephrine, norepinephrine, phenylephrine, octopamine, phenethylamine, histamine, nicotine, propanolol, L-DOPA, phenylalanine, tyrosine, histidine, tryptophan, TrpNH2, 5-HTP, tryptophan-glycine, indole, Indole-3-acetic acid, melatonin, adenosine, estradiol, propanil, catechol, paracetamol, acetylcholine, glycine, D-serine, aspartate, glutamate, GABA, cadaverine, ethanolamine and glucose.

9. The method of claim 1, for the determination of neutral, zwitterionic and/or positively charged bioanalytes in an aqueous medium selected from the group consisting of physiological media, endogenous fluids, secretions, PBS, urine, saliva, blood, sweat, semen, amniotic fluid, tear fluid or cerebrospinal fluid.

10. The method of claim 3, wherein (i) the bioanalytes to be determined are selected from the group of positively charged bioanalytes and the monodisperse nanozeolites have an Si/Al ratio of from 0.5 to 50, or (ii) the bioanalytes to be determined are selected from the group of neutral or zwitterionic bioanalytes and the monodisperse nanozeolites have an Si/Al ratio of from 10 to 20.

11. The method of claim 1, wherein the functionalised dyes or indicator molecules are sterically anchored in the cavities of the monodisperse nanozeolites by covalent or chemical bonding or polymerisation of the dye/indicator monomers among each other within the zeolite cavities.

12. The method of claim 1, wherein
   (a) the at least one of (i) neutral, (ii) zwitterionic and (iii) positively charged bioanalytes with the chemosensors comprising the doped monodisperse nanozeolites are comprised in an aqueous dispersion and the bioanalytes in the dispersion are determined by UV-vis or fluorescence spectroscopy, or
   (b) a layer of the aqueous dispersion according to (a) is prepared by spraying or aerosol printing on a carrier and the bioanalytes in the layer are determined by UV-vis or fluorescence spectroscopy.

13. The method of claim 12, wherein the bioanalytes in the dispersion or in the layer are determined by UV-vis spectroscopy.

14. The method of claim 12, wherein prior to step (a) the chemosensors comprising the monodisperse nanozeolites are prepared comprising particulating a zeolite material to a monodisperse particle size distribution in the range of 5 to 400 nm by means of sonication with an acoustic intensity.

15. The method of claim 12, wherein the chemosensors comprising the monodisperse nanozeolites are prepared by sterile high-pressure filtration.

16. The method of claim 14, wherein the doping of the nanozeolites with one or more functionalised dyes or indicators, is carried out before or after the intensity-sonication.

17. A chemosensor comprising monodisperse nanozeolites having a particle size distribution in the range of 5 to 400 nm doped with one or more functionalised dyes or indicators sterically anchored in the cavities of the monodisperse nanozeolites.

* * * * *